United States Patent
Kobayashi

(10) Patent No.: US 9,041,670 B2
(45) Date of Patent: May 26, 2015

(54) OPERATION CONTROL APPARATUS AND OPERATION CONTROL METHOD FOR EXTERNAL APPARATUS CONNECTED TO VEHICLE-MOUNTED APPARATUS

(75) Inventor: Tomoki Kobayashi, Fukushima (JP)

(73) Assignee: Alpine Electronics, Inc., Tokyo (JP)

( * ) Notice: Subject to any disclaimer, the term of this patent is extended or adjusted under 35 U.S.C. 154(b) by 196 days.

(21) Appl. No.: 13/611,852

(22) Filed: Sep. 12, 2012

(65) Prior Publication Data
US 2013/0082952 A1 Apr. 4, 2013

(30) Foreign Application Priority Data
Sep. 30, 2011 (JP) .................. 2011-216644

(51) Int. Cl.
*G06F 3/041* (2006.01)
*H04N 5/445* (2011.01)
*G06F 3/0488* (2013.01)
*H04N 21/422* (2011.01)
*H04N 21/41* (2011.01)
*H04N 21/414* (2011.01)
(Continued)

(52) U.S. Cl.
CPC ............ *H04N 5/44513* (2013.01); *B60K 37/06* (2013.01); *B60K 2350/1004* (2013.01); *B60K 2350/1016* (2013.01); *B60K 2350/1024* (2013.01); *B60K 2350/35* (2013.01); *G06F 3/0488* (2013.01); *H04N 21/42208* (2013.01); *B60K 2350/1032* (2013.01); *H04N 21/4126* (2013.01); *H04N 21/41422* (2013.01); *H04N 21/42207* (2013.01); *H04N 21/42224* (2013.01); *H04N 21/42227* (2013.01); *H04N 21/47217* (2013.01); *H04N 21/8113* (2013.01)

(58) Field of Classification Search
CPC .............. B60K 2350/1004; B60K 2350/1016; B60K 2350/1024; B60K 2350/1032; G06F 3/0488
USPC ........................................ 345/173
See application file for complete search history.

(56) References Cited

U.S. PATENT DOCUMENTS 8,650,505 B2 2/2014 Anttila et al.
2008/0141129 A1 6/2008 Oozawa et al.
(Continued)

FOREIGN PATENT DOCUMENTS

DE 10 2010 011 480 9/2011
JP 2007-052643 3/2007
(Continued)

OTHER PUBLICATIONS

European Search Report for Application No. 12186339.3, dated Sep. 23, 2013, 5 pages.
(Continued)

*Primary Examiner* — Viet Pham
(74) *Attorney, Agent, or Firm* — Brinks Gilson & Lione

(57) ABSTRACT

There are provided an operation determining unit which, when a touch panel is pressed, determines whether or not the press on the touch panel has been an operation on a soft key for designating one of the plurality of functions assigned to the one hard key, and a state transition unit which, when it is determined that the press corresponds to an operation on the soft key, shifts a function acceptability state of the one hard key. Thus, when the soft key corresponding to the hard key is pressed, the function acceptability state of the hard key is shifted to a correct state, even without actually operating one hard key.

13 Claims, 11 Drawing Sheets

(51) Int. Cl.
*H04N 21/472* (2011.01)
*B60K 37/06* (2006.01)
*H04N 21/81* (2011.01)

(56) References Cited

U.S. PATENT DOCUMENTS

| | | | |
|---|---|---|---|
| 2009/0176469 A1* | 7/2009 | Nagara et al. | 455/186.1 |
| 2010/0013780 A1 | 1/2010 | Ikeda et al. | |
| 2010/0079794 A1* | 4/2010 | Kim | 358/1.15 |
| 2010/0214238 A1* | 8/2010 | Christoph et al. | 345/173 |
| 2011/0047494 A1* | 2/2011 | Chaine et al. | 715/769 |

FOREIGN PATENT DOCUMENTS

| | | |
|---|---|---|
| JP | 2008-078860 | 4/2008 |
| JP | 2008-146454 | 6/2008 |
| JP | 2010-026710 | 2/2010 |
| JP | 2010-083206 | 4/2010 |
| JP | 2010-521025 | 6/2010 |
| JP | 2011-051164 | 3/2011 |
| JP | 2011-113469 | 6/2011 |
| WO | 2010-140282 | 12/2010 |

OTHER PUBLICATIONS

JPO Office Action for Japanese Patent Application No. 2011-216644 dispatched on Dec. 9, 2014, 6 pages, including English translation.

* cited by examiner

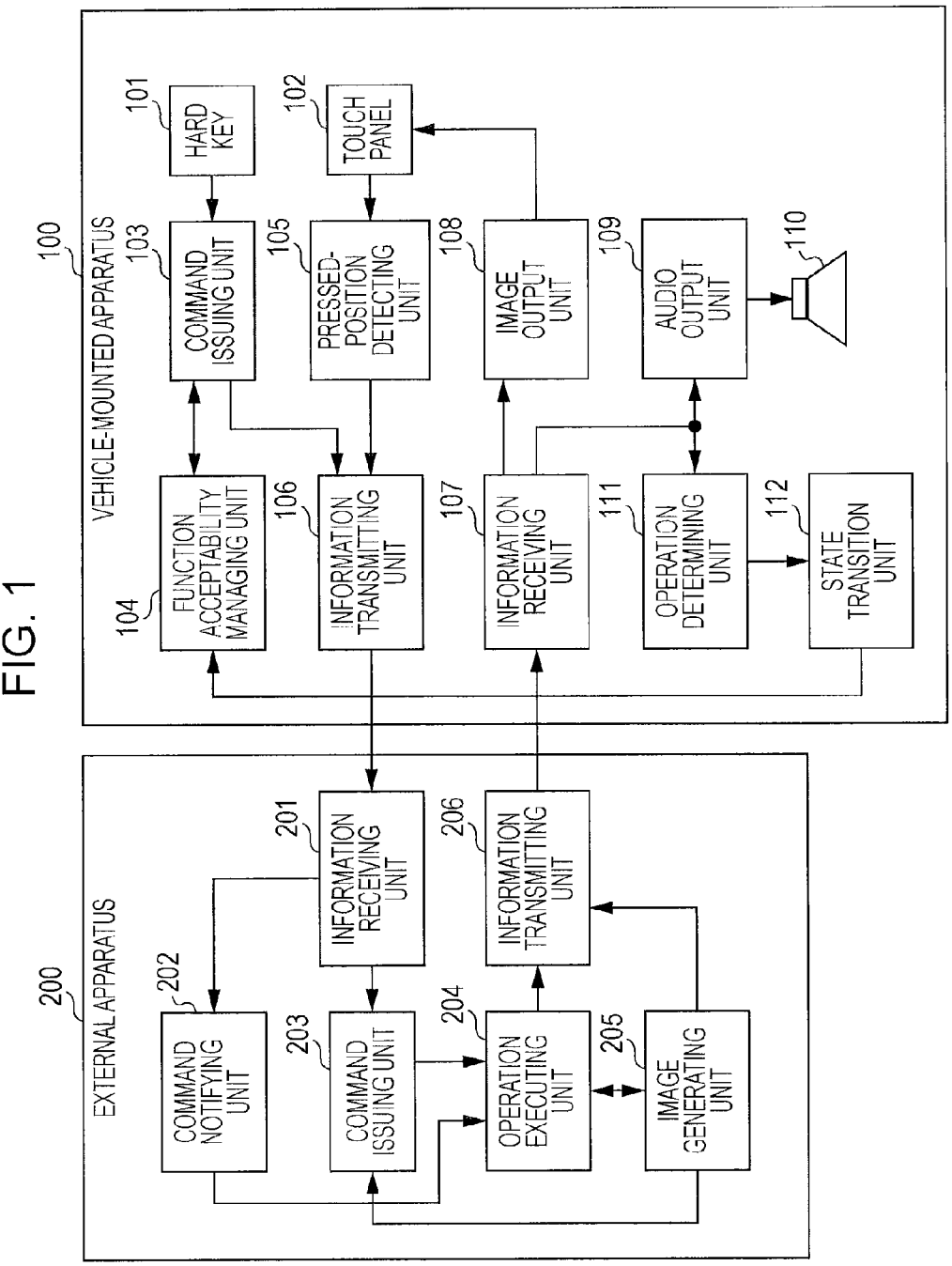

OPERATION CONTROL APPARATUS AND OPERATION CONTROL METHOD FOR EXTERNAL APPARATUS CONNECTED TO VEHICLE-MOUNTED APPARATUS

RELATED APPLICATIONS

The present application claims priority to Japanese Patent Application Serial Number 2011-216644, filed Sep. 30, 2011, the entirety of which is hereby incorporated by reference.

BACKGROUND OF THE INVENTION

1. Field of the Invention

The present disclosure relates to operation control apparatuses and operation control methods for an external apparatus connected to a vehicle-mounted apparatus. The present disclosure particularly relates to an art of controlling an operation on an external apparatus connected to a vehicle-mounted apparatus in accordance with an operation on a soft key displayed on a touch panel of the vehicle-mounted apparatus or a hard key provided in the vehicle-mounted apparatus.

2. Description of the Related Art

In recent years, technologies have been proposed that allow a function of an external apparatus to be used through a vehicle-mounted apparatus by connecting the external apparatus to the vehicle-mounted apparatus. For example, a technology has been proposed which allows a tune stored in a portable digital music player as an external apparatus to be played through a vehicle-mounted apparatus connected to the portable digital music player. Another technology has been proposed which connects a mobile terminal (what-is-called a smart phone) having both the functions of a cellular phone and the functions of a portable information terminal (PDA) to a vehicle-mounted apparatus to allow a function of an application installed in the smart phone to be used through the vehicle-mounted apparatus.

When a function of an external apparatus is used through a vehicle-mounted apparatus in this way, an operation in the external apparatus may be controlled from the vehicle-mounted apparatus. For example, in order to play a tune stored in an external apparatus through a vehicle-mounted apparatus, an operation for playing, starting or stopping or pausing the music may be controlled from the vehicle-mounted apparatus side. An instruction for the operation control may be issued by operating a hard key (such as a play button, a stop button, and a pause button) provided in the vehicle-mounted apparatus.

For example, when a play button in a vehicle-mounted apparatus is pressed, the vehicle-mounted apparatus transmits a play start command to an external apparatus. On the basis of the play start command transmitted from the vehicle-mounted apparatus, the external apparatus performs an operation for playing music. The reproduced sound data of the tune is transmitted to the vehicle-mounted apparatus, and the reproduced sound is output from a speaker of the vehicle-mounted apparatus. When a pause button in the vehicle-mounted apparatus is pressed during a music play operation, the vehicle-mounted apparatus transmits a pause command to the external apparatus. On the basis of the pause command transmitted from the vehicle-mounted apparatus, the external apparatus performs a music pause operation.

When soft keys such as play start, play stop, and pause are displayed on a display apparatus with a touch panel of a vehicle-mounted apparatus (hereinafter, simply called a touch panel), an operation control over an external apparatus may be instructed from the vehicle-mounted apparatus side by operating either hard key or soft key. Japanese Unexamined Patent Application Publication No. 2007-52643 discloses an art which includes a first mode for an operation by using a hard key and a second mode for an operation by using a soft key, wherein an operation on a soft key when the first mode is set and an operation on a hard key when the second mode is set are inhibited.

In order to display soft keys on a touch panel of a vehicle-mounted apparatus, image information including the soft keys may be transmitted from an external apparatus to the vehicle-mounted apparatus to display the image information on the touch panel. According to this method, the vehicle-mounted apparatus may not grasp the positions of soft keys on the touch panel. In other words, when one of the soft keys displayed on a touch panel is pressed, the vehicle-mounted apparatus may locate the pressed position but may not identify which soft key has been pressed. For that, the vehicle-mounted apparatus transmits pressed position information describing the pressed position to the external apparatus. The external apparatus identifies which soft key has been pressed on the basis of the pressed position information transmitted from the vehicle-mounted apparatus and performs an operation corresponding to the identified soft key.

It will be appreciated that, in order to save the space where hard keys are disposed, one button (play/pause button) may often be used as both of a play start button and a pause button in a vehicle-mounted apparatus. In this case, every time the play/pause button is pressed, play start and pause operations are performed alternately. On the basis of the change of the execution state, which operation of the operations associated with the play/pause button is acceptable is changed alternately.

In other words, in an initial state, the play/pause button in the vehicle-mounted apparatus may accept a play start command. When the play/pause button is pressed in this state, music is started to play in the external apparatus, and the play/pause button shifts to a state in which a pause command is acceptable. When the play/pause button is pressed in this state, the play of music in the external apparatus is paused. The play/pause button shifts to a play start acceptable state. After this, every time the play/pause button is pressed, these operations are repeated.

Regarding soft keys displayed on a touch panel of a vehicle-mounted apparatus, the displays of a play button and a pause button may be switched alternately at one position in many cases in order to save the display space of the soft keys. In other words, in an initial state, a play button is displayed. When the play button is pressed, music starts to play, and a pause button is displayed instead of the play button. When the pause button is pressed in this state, the music playback is paused in the external apparatus, and the play button is displayed instead of the pause button. After this, every time the play button and pause button are pressed, these operations are repeated.

As described above, when soft keys are displayed on a touch panel of a vehicle-mounted apparatus, an operation control over an external apparatus may be instructed from the vehicle-mounted apparatus side by operating either hard key or soft key. However, when image information including soft keys is transmitted from the external apparatus to the vehicle-mounted apparatus including a play/pause button as hard keys to display the soft keys on the touch panel, a malfunction, as will be described below, may occur.

FIGS. 11A to 11C are diagrams for illustrating conventional malfunctions. FIG. 11A illustrates a state where music is being played as a result of press of a play/pause button 11 in a vehicle-mounted apparatus. In this case, the play/pause button 11 as a hard key is a pause acceptable state. A pause button 12 is displayed as one of soft keys on the touch panel. In other words, when an external apparatus receives a play start command from a vehicle-mounted apparatus, an external apparatus generates image information including the pause button 12. As a result of transmission of the image information from the external apparatus to the vehicle-mounted apparatus, the pause button 12 is displayed.

When the pause button 12 of the soft keys is pressed in this state, the vehicle-mounted apparatus transmits pressed position information describing the pressed position to the external apparatus. The external apparatus determines that the pause button 12 has been pressed on the basis of the pressed position information transmitted from the vehicle-mounted apparatus and executes a pause operation. The external apparatus further generates image information including a play button 13 as one of the soft keys and transmits the image information to the vehicle-mounted apparatus. FIG. 11B illustrates a state where the image information transmitted from the external apparatus is displayed on the touch panel of the vehicle-mounted apparatus. In other words, the touch panel displays the play button 13 as one of the soft keys instead of the pause button 12.

While music is paused as illustrated in FIG. 11B, the play button 13 is properly displayed as a soft key while the play/pause button 11 as a hard key still has the pause acceptable state. Even when the pause button 12 on the touch panel is pressed in the state in FIG. 11A, the vehicle-mounted apparatus is only allowed to grasp the pressed position but is not allowed to securely determine that the pause button 12 has been pressed.

Therefore, when the play/pause button 11 is pressed in the pause state as illustrated in FIG. 11B, a pause command is transmitted from the vehicle-mounted apparatus to the external apparatus though it has already been in the pause state. In this case, an error occurs that the operational state does not change even though the play/pause button 11 is pressed. In other words, even though a user presses the play/pause button 11 to restart playing music, the pause state is maintained such that music does not begin to play and the display of the soft key does not change such that the play button 13 is still displayed, as illustrated in FIG. 11C.

This problem is not limited to the case where one play/pause button 11 is used for switching between a play start function and a pause function. For example, the same problem may occur in cases where a plurality of functions are assigned to one hard key, and the hard key is used to switch between the corresponding operations every time the hard key is pressed, such as a case where one mute button is used for switching a mute function on and off or a case where one power button is used to switch a power supply on and off.

SUMMARY OF THE INVENTION

Implementations of the present invention solve this problem, and it is an object of implementations of the present invention to configure, in a vehicle-mounted apparatus in which a plurality of functions are assigned to one hard key and soft keys corresponding to the plurality of functions are alternately switched on the basis of image information transmitted from the external apparatus and are displayed on a touch panel thereof, to cause an external apparatus to operate properly in both cases where a hard key is operated and a soft key is operated.

To address these problems, in implementations of the present invention, when a touch panel displaying soft keys on the basis of image information transmitted from an external apparatus to a vehicle-mounted apparatus is pressed, whether the activation on the touch panel has been an operation on a soft key for designating one of a plurality of functions assigned to one hard key or not is determined. If it is determined that the operation corresponds to an operation on the soft key, a function acceptability state of the one hard key is shifted.

According to implementations of the present invention configured as described above, even when one hard key assigned to a plurality of functions is not actually operated but when a soft key corresponding to the one hard key is pressed, it is detected by an operation determining unit. A function acceptability state of the one hard key is shifted by a state transition unit. Thus, it may be securely detected that a soft key corresponding to the one hard key is pressed, and the function acceptability state of the one hard key may be shifted to a proper state even when whether a soft key has been operated or not is immediately grasped from a pressed position on a touch panel because soft keys are displayed thereon on the basis of image information from an external apparatus to a vehicle-mounted apparatus. This may cause the external apparatus to perform a proper operation in either case where a hard key is operated or a soft key is operated.

BRIEF DESCRIPTION OF THE DRAWINGS

FIG. 1 is a block diagram illustrating functional components of an exemplary system including an operation control apparatus according to a first embodiment;

DETAILED DESCRIPTION OF THE DRAWINGS

First Embodiment

Figure 2A:
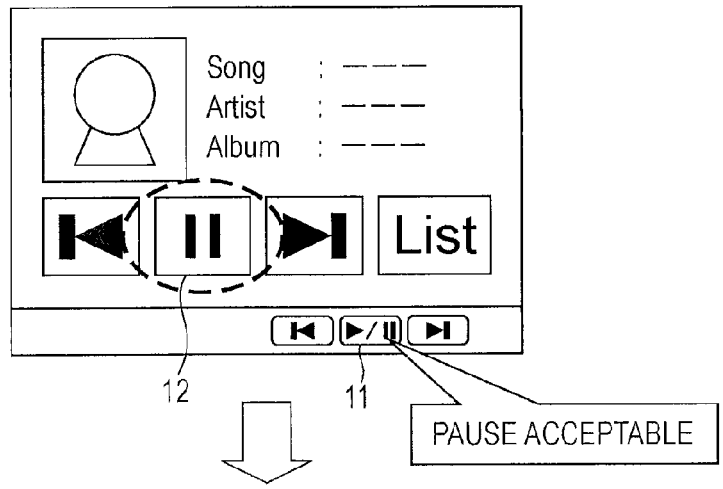
FIGS. 2A to 2C illustrate transitions of a display state of a soft key and a function acceptability state of a hard key according to the first embodiment.

Embodiments of the present invention will be described below with reference to the attached drawings. FIG. 1 is a block diagram illustrating functional components of an exemplary system including an operation control apparatus according to a first embodiment. The system includes a vehicle-mounted apparatus 100 and an external apparatus 200 which are connected in a wired or wireless manner. In some implementations, the external apparatus 200 may be a smart phone having a music play function, for example.

The vehicle-mounted apparatus 100 includes hard keys 101 and a touch panel 102. One of the hard keys 101 may be a play/pause button 11 for instructing music play start and pause operations alternately. In other words, a plurality of functions such as play start and pause functions are assigned to one play/pause button 11. The hard keys 101 may include a play stop button and a skip button in addition to the play/pause button 11. The play/pause button 11 will be described mainly according to the first embodiment.

The touch panel 102 is configured to display a soft key on the basis of image information transmitted from the external apparatus 200. The soft key may include a pause button 12 and a play button 13. Every time one of the pause and/or play buttons 12, 13 is pressed, the displays of the buttons are switched alternately. Other buttons such as a play stop button and a skip button may be provided as soft keys. However, the pause button 12 and play button 13 will be described mainly according to this embodiment.

The vehicle-mounted apparatus 100 includes functional components of a command issuing unit 103, a function acceptability state managing unit 104, a pressed position detecting unit 105, an information transmitting unit 106, an information receiving unit 107, an image output unit 108, an audio output unit 109, an operation determining unit 111 and a state transition unit 112. These functional components are provided actually with a CPU or MPU, a RAM, a ROM and so on in a computer and may be implemented by manipulating a program stored in the RAM or ROM.

The external apparatus 200 includes functional components of an information receiving unit 201, a command notifying unit 202, a command issuing unit 203, an operation executing unit 204, an image generating unit 205 and an information transmitting unit 206. These functional components, too, are provided actually with a CPU or MPU, a RAM, a ROM and so on in a computer and may be implemented by manipulating a program stored in the RAM or ROM.

A recording medium to store the program may be a CD-ROM, a flexible disk, a hard disk, a magnetic tape, an optical disk, a magneto-optical disk, a DVD, a non-volatile memory card or the like. Alternatively, the program may be downloaded to the vehicle-mounted apparatus 100 and/or the external apparatus 200 over a network such as the Internet.

An operation control apparatus according to this embodiment is provided in the vehicle-mounted apparatus 100 and controls an operation by the external apparatus 200 in accordance with an operation on one of the hard keys 101 or the soft keys on the touch panel 102. The operation control apparatus of this embodiment includes the information transmitting unit 106, information receiving unit 107, operation determining unit 111 and state transition unit 112 of the functional components of the vehicle-mounted apparatus 100 illustrated in FIG. 1.

The command issuing unit 103 in the vehicle-mounted apparatus 100 determines which hard key 101 has been operated by a user and issues an operation instruction command corresponding to the operated hard key 101. For example, when a user operates the play/pause button 11, either play start command or pause command is issued. Which command is to be issued depends on the current function acceptability state managed by the function acceptability state managing unit 104.

The function acceptability state managing unit 104 initially sets the play/pause button 11 in a play start acceptable state. When the play/pause button 11 is pressed in this state, the command issuing unit 103 issues a play start command on the basis of the current function acceptability state managed by the function acceptability state managing unit 104. In this case, the function acceptability state managing unit 104 receives a notification that the play/pause button 11 has been pressed from the command issuing unit 103 and shifts the play/pause button 11 to a pause acceptable state.

When the play/pause button 11 is further pressed in this state, the command issuing unit 103 issues a pause command on the basis of the current function acceptability state managed by the function acceptability state managing unit 104. In this case, the function acceptability state managing unit 104 receives a notification that the play/pause button 11 has been pressed from the command issuing unit 103 and shifts the play/pause button 11 to the play start acceptable state.

The pressed position detecting unit 105 detects the pressed position on the touch panel 102 when the touch panel 102 is pressed. The pressed position detecting unit 105 further converts the information on the detected pressed position on the touch panel 102 to pressed position information describing which position has been pressed on the image displayed on the touch panel 102. The pressed position detecting unit 105 pre-holds information describing a correspondence relationship between positional information (coordinate information) on the touch panel 102 and positional information (coordinate information) on the image. On the basis of the information, the pressed position detecting unit 105 converts the pressed position information.

The pressed position detecting unit 105 converts the pressed position information on the touch panel 102 to the pressed position information on the image because the external apparatus 200 does not grasp a correspondence relationship between the positional information (coordinate information) on the touch panel 102 and the positional information (coordinate information) on the image. If information on the correspondence relationship is pre-stored in the external apparatus 200, the conversion of the pressed position information as described above by the pressed position detecting unit 11 is not required. Thus, the pressed position information transmitted by the claimed positional information transmitting unit may be pressed position information on the touch panel 102 or may be pressed position information on the image.

The information transmitting unit 106 transmits an operation instruction command (such as a play start command or a pause command) issued by the command issuing unit 103 or pressed position information detected by the pressed position detecting unit 105 to the external apparatus 200 as information for controlling an operation in the external apparatus 200. The information transmitting unit 106 corresponds to the claimed positional information transmitting unit.

The information receiving unit 201 in the external apparatus 200 receives an operation instruction command or pressed position information transmitted by the information transmitting unit 106 in the vehicle-mounted apparatus 100. If the information receiving unit 201 receives an operation instruction command, the operation instruction command is output to the command notifying unit 202. If the information receiving unit 201 receives pressed position information, the pressed position information is output to the command issuing unit 203.

The command notifying unit 202 notifies the operation instruction command supplied from the information receiving unit 201 to the operation executing unit 204. In accordance with the operation instruction command notified from the command notifying unit 202, the operation executing unit 204 performs the operation according to the operation instruction command. In other words, if the operation instruction command is a play start command, the operation executing unit 204 executes a music play operation. If the operation instruction command is a pause command, the operation executing unit 204 performs a music pause operation. The operation executing unit 204 outputs the audio information generated by the music play to the information transmitting unit 206.

On the basis of the pressed position information supplied from the information receiving unit 201, the command issuing unit 203 issues the operation instruction command corresponding to the pressed position on the touch panel 102 (pressed position on the image) to the operation executing unit 204. Because the image information (including soft keys) displayed on the touch panel 102 is generated by the external apparatus 200, the positions of the soft keys on the image may be understood by the external apparatus 200. Thus, by locating the pressed position on the touch panel 102, the command issuing unit 203 may identify which soft key has been pressed and issue the operation instruction command corresponding to the identified soft key.

The image generating unit 205 generates the image information to be displayed on the touch panel 102 of the vehicle-mounted apparatus 100. The image generating unit 205 then outputs the generated image information to the information transmitting unit 206. The image information generated by the image generating unit 205 contains soft keys such as the pause button 12 and the play button 13. Notably, the pause button 12 and the play button 13 may be switched alternately in accordance with the execution state of the operation by the operation executing unit 204.

In other words, while the operation executing unit 204 is performing a music play operation, the image generating unit 205 generates image information including the pause button 12 as a soft key. While the operation executing unit 204 is performing a music pause operation, the image generating unit 205 generates image information including the play button 13 as a soft key. Notably, image generating unit 205 may not be required to generate image information at all times but may generate it at least when the operational state of operation executing unit 204 is switched.

The image generating unit 205 generates a soft key included in the image information and soft key information describing the position and notifies them to the command issuing unit 203. The command issuing unit 203 holds the soft key information notified from the image generating unit 205 until the next new soft key information is notified. On the basis of the pressed position information supplied from the information receiving unit 201 and the soft key information supplied from the image generating unit 205 and held, the command issuing unit 203 identifies the soft key corresponding to the pressed position and issues the operation instruction command corresponding to the identified soft key.

The information transmitting unit 206 transmits the audio information supplied from the operation executing unit 204 and the image information supplied from the image generating unit 205 to the vehicle-mounted apparatus 100. While the operation executing unit 204 is executing the music play, the operation executing unit 204 supplies the audio information to the information transmitting unit 206 at all times. Thus, the information transmitting unit 206 transmits the audio information to the vehicle-mounted apparatus 100 at all times.

On the other hand, when the execution state of the operation executing unit 204 is switched from a music play to a pause or vise versa, the image information having the soft key switched correspondingly is generated by the image generating unit 205 and is supplied to the information transmitting unit 206. Thus, when the execution state of the operation executing unit 204 is changed, the information transmitting unit 206 transmits the image information supplied from the image generating unit 205 to the vehicle-mounted apparatus 100.

The information receiving unit 107 of the vehicle-mounted apparatus 100 receives the audio information and image information transmitted from the information transmitting unit 206 of the external apparatus 200. The information receiving unit 107 supplies the received image information to the image output unit 108. The image output unit 108 outputs the image information supplied from the information receiving unit 107 to the touch panel 102 to display the image information including the soft key. Notably, the image output unit 108 pre-holds information describing a correspondence relationship between the positional information (coordinate information) on the touch panel 102 and the positional information (coordinate information) on the image. On the basis of the information, the image output unit 108 expands and displays the image information on a screen of the touch panel 102.

The information receiving unit 107 supplies the received audio information to the audio output unit 109 and operation determining unit 111. The audio output unit 109 outputs the audio information supplied from the information receiving unit 107 to the speaker 110 to output the reproduced music through the speaker 110.

On the basis of the change of the state of the audio information transmitted from the external apparatus 200 as a result of transmission of the pressed position information from the information transmitting unit 106 to the external apparatus 200 in accordance with the press on the touch panel 102, the operation determining unit 111 determines whether the press on the touch panel 102 has been an operation on a soft key (pause button 12 or play button 13) for designating one (either play start function or pause function) of a plurality of functions assigned to the one hard key 101 that is the play/pause button 11.

More specifically, when the audio information changes from an output state to a stop state, that is, when the information receiving unit 107 changes from an audio information receiving state to a non-receiving state, the operation determining unit 111 determines that the press on the touch panel 102 has been an operation on the soft key (pause button 12) for designating a pause. On the other hand, when the audio information changes from the stop state to the output state, that is, when the information receiving unit 107 changes from the audio information non-receiving state to the receiving state, the operation determining unit 111 determines that the press on the touch panel 102 has been an operation on the soft key (play button 13) for designating a play start.

In this case, when it is detected that audio information has changed from the output state to the stop state or from the stop state to the output state, it is immediately determined that the press on the touch panel 102 has been an operation on the pause button 12 or play button 13. However, when a plurality of tunes are continuously played, the audio information changes from the output state to the stop state also upon change of tunes and returns to the output state after a short period of time. In order to prevent a false determination that the pause button 12 or play button 13 has been operated, the determination is preferably performed by the operation determining unit 111 only when the information transmitting unit 106 transmits the pressed position information to the external apparatus 200 (only when the touch panel 102 is pressed).

Also when a skip button is pressed, the audio information is changed from the output state to the stop state and returns to the output state after a short period of time. Thus, means is preferably taken for preventing a false determination that the pause button 12 or play button 13 has been operated. Accordingly, when audio information changes from the output state to the stop state, or from the stop state to the output state, and it is detected that the state after the change has continued for a predetermined period of time, it may be determined that the pause button 12 or play button 13 has been operated.

This may prevent a false determination not only when a skip button has been pressed, but also when tunes to be played continuously are switched. The predetermined period of time in this case may be set longer than a mute time until the next tune is played as a result of a skip operation or a mute time until the next tune is played in a continuous play mode.

When a skip button is pressed and held, it may be configured to perform a forward operation or a rewind operation. In this case, while the skip button is being held, the audio information has the output stop state (mute state). Accordingly, the operation determining unit 111 may have a function of inhibiting the determination while the skip button displayed as a soft key on the touch panel 102 is being held.

If the operation determining unit 111 determines that the press on the touch panel 102 has been an operation on the pause button 12 or play button 13 as a soft key, the state transition unit 112 shifts the function acceptability state of the play/pause button 11 provided as one hard key.

In other words, if the operation determining unit 111 determines that the press on the touch panel 102 has been an operation on the pause button 12, the state transition unit 112 shifts the function acceptability state of the play/pause button 11 managed by the function acceptability state managing unit 104 from a pause acceptable state to a play start acceptable state. On the other hand, if the operation determining unit 111 determines that the press on the touch panel 102 has been an operation on the play button 13, the state transition unit 112 shifts the function acceptability state of the play/pause button 11 managed by the function acceptability state managing unit 104 from the play start acceptable state to the pause acceptable state.

Figure 2B:
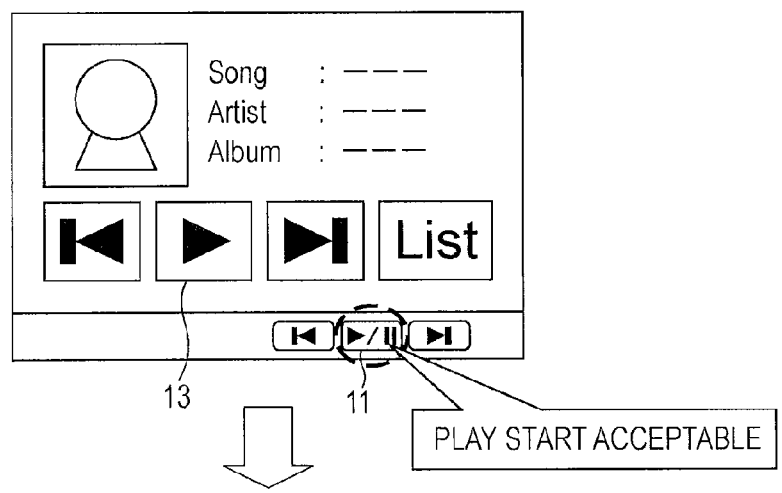
Figure 2C:
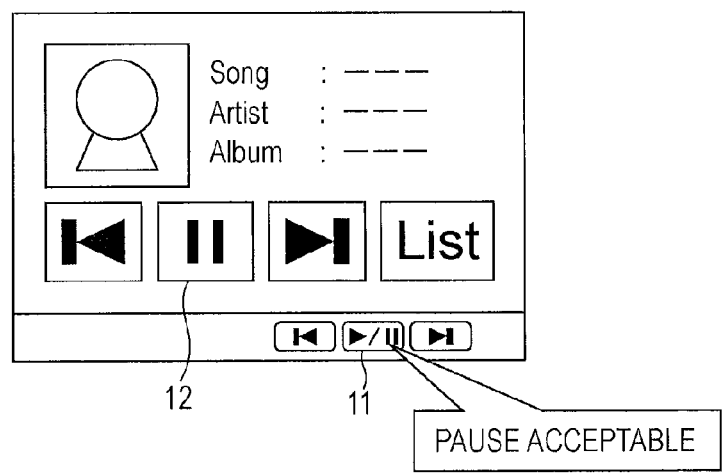

FIGS. 2A to 2C illustrate transitions of a display state of a soft key and a function acceptability state of a hard key according to the first embodiment. FIG. 2A illustrates a state that music is being played as a result of a press on the play/pause button 11 of the vehicle-mounted apparatus 100. In this case, the function acceptability state managing unit 104 sets the play/pause button 11 as a hard key 101 to a pause acceptable state.

The pause button 12 is being displayed as one of the soft keys on the touch panel 102. In other words, the play start command issued by the command issuing unit 103 in the vehicle-mounted apparatus 100 is received by the external apparatus 200. Image information including the pause button 12 is generated by the image generating unit 205. As a result of transmission of the image information from the information transmitting unit 206 to the vehicle-mounted apparatus 100, the image information including the pause button 12 as one of soft keys is displayed on the touch panel 102.

When the pause button 12 as a soft key is pressed in the state, the information transmitting unit 106 in the vehicle-mounted apparatus 100 transmits pressed position information describing the pressed position to the external apparatus 200. In the external apparatus 200, on the basis of the pressed position information transmitted from the vehicle-mounted apparatus 100, the command issuing unit 203 determines that the pause button 12 has been pressed and issues a pause command to the operation executing unit 204. In accordance with the pause command, the operation executing unit 204 executes a pause operation.

The image generating unit 205 generates image information including the play button 13 as one of soft keys. The information transmitting unit 206 transmits the image information to the vehicle-mounted apparatus 100. FIG. 2B illustrates a state that the image information transmitted from the external apparatus 200 is being displayed on the touch panel 102 of the vehicle-mounted apparatus 100. In other words, the touch panel 102 is displaying the play button 13, instead of the pause button 12, as one of the soft keys.

The execution of the pause operation by the operation executing unit 204 inhibits the information transmitting unit 206 in the external apparatus 200 to output audio information. The information receiving unit 107 in the vehicle-mounted apparatus 100 changes from an audio information receiving state to a non-receiving state. On the basis of the change of the state of the audio information, the operation determining unit 111 determines that the pause button 12 as a soft key has been pressed and notifies it to the state transition unit 112. In response to the notification, the state transition unit 112 shifts the function acceptability state of the play/pause button 11 managed by the function acceptability state managing unit 104 from a pause acceptable state to a play start acceptable state.

As a result, when the play/pause button 11 is pressed in the pause state illustrated in FIG. 2B, the command issuing unit 103 may transmit a proper play start command to the external apparatus 200. Thus, in the external apparatus 200, the operation executing unit 204 correctly switches from the pause state to the operational state, and a music play operation is started. Also as illustrated in FIG. 2C, the display of the soft key correctly changes from the display of the play button 13 to the display of the pause button 12.

Figure 3:
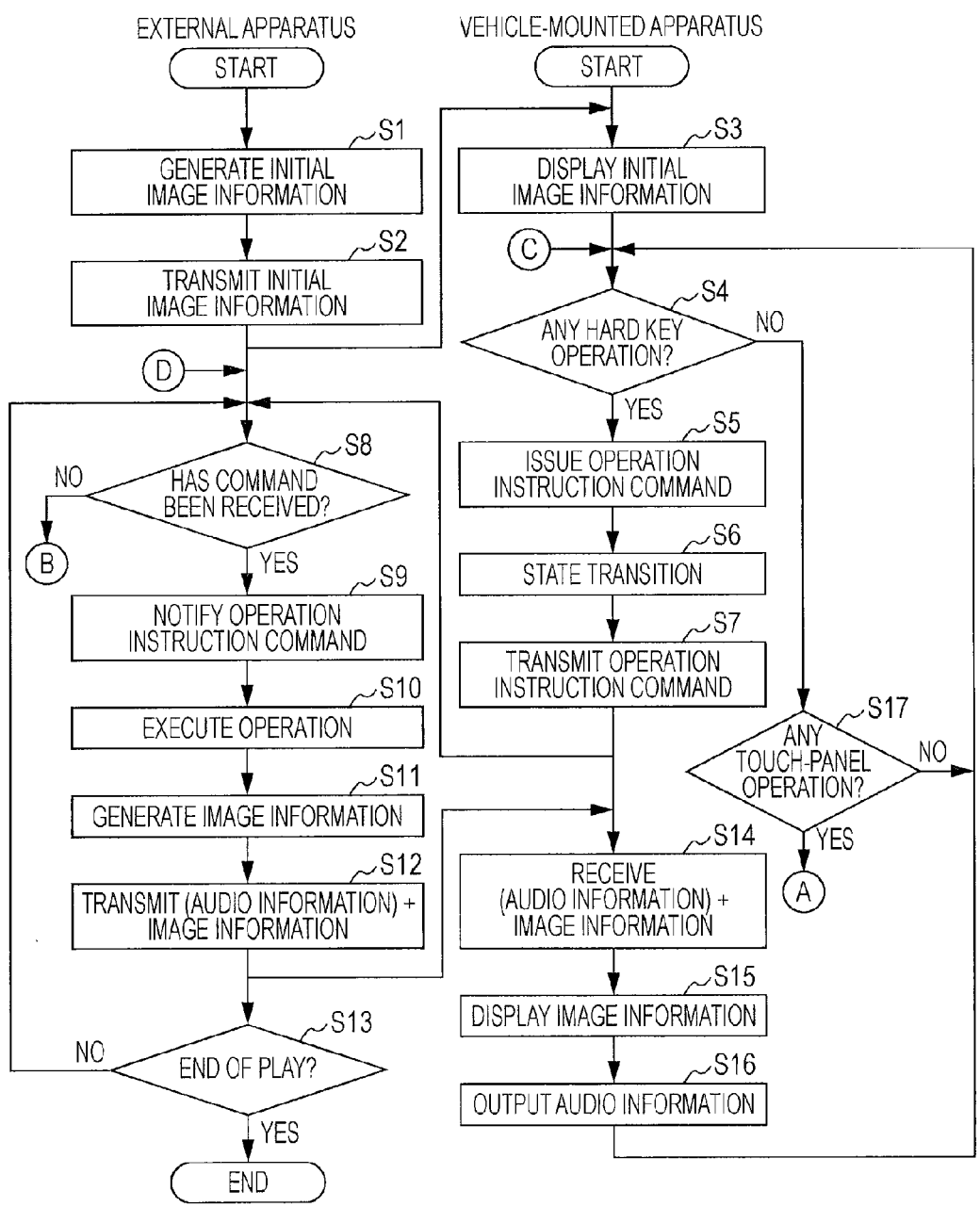
FIG. 3 is a flowchart illustrating an operation example of a system including an operation control apparatus according to the first embodiment.
Figure 4:
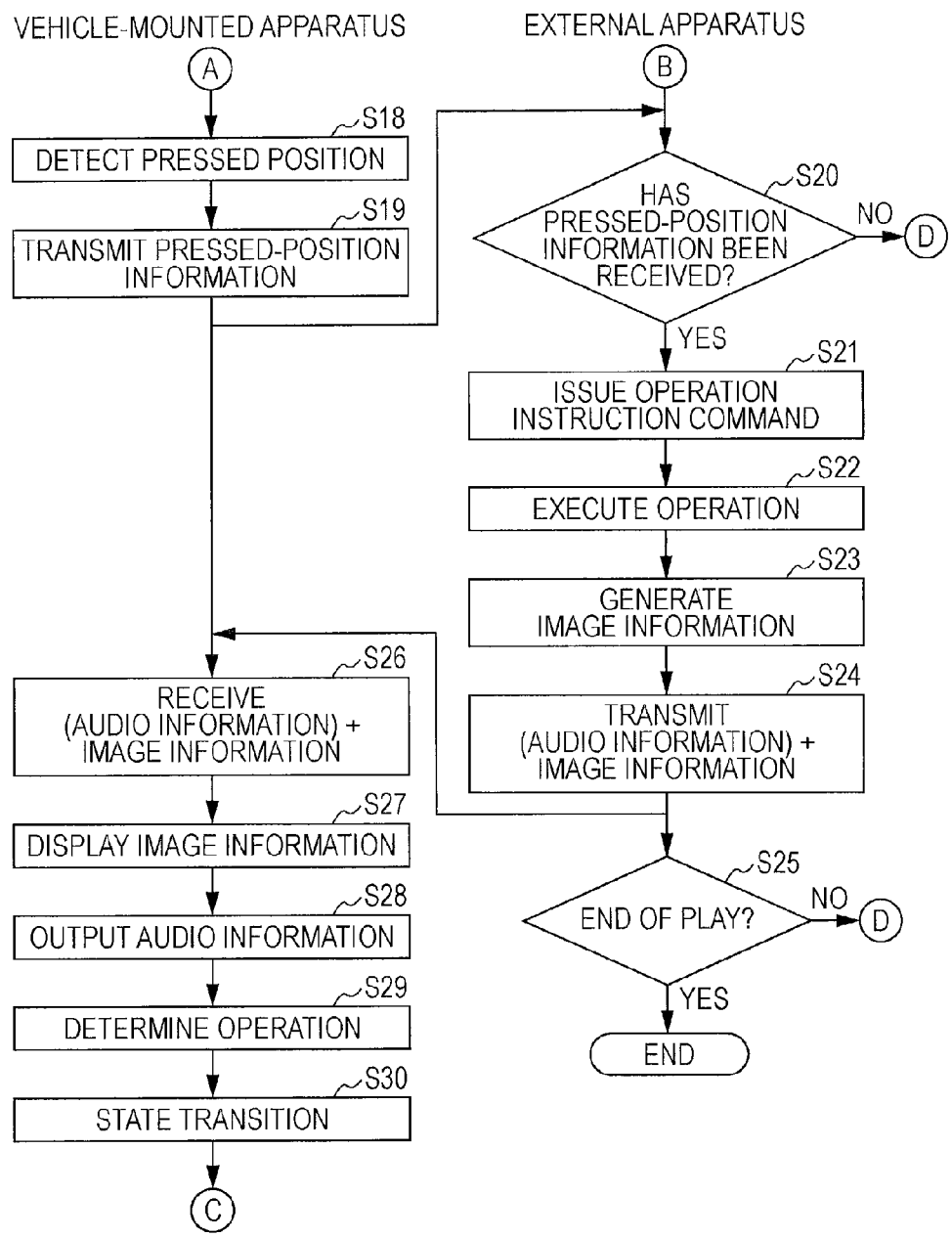
FIG. 4 is a flowchart illustrating an operation example of a system including an operation control apparatus according to the first embodiment.

FIG. 3 and FIG. 4 are flowcharts illustrating operation examples of a system including an operation control apparatus according to the first embodiment. The flowchart illustrated in FIG. 3 starts when the vehicle-mounted apparatus 100 and the external apparatus 200 are connected, and the vehicle-mounted apparatus 100 instructs a music play operation in the external apparatus 200 (for example, when an application for playing music is started). At the time of the start of the processing illustrated in FIG. 3, it is assumed that the function acceptability state managing unit 104 initially sets the play/pause button 11 in a play start acceptable state.

Referring to FIG. 3, the image generating unit 205 in the external apparatus 200 first generates initial image information including the play button 13 as one of soft keys (step S1). The information transmitting unit 206 transmits the initial image information to the vehicle-mounted apparatus 100 (step S2). In the vehicle-mounted apparatus 100, the information receiving unit 107 receives the initial image information transmitted from the external apparatus 200, and the image output unit 108 displays it on the touch panel 102 (step S3).

In the state that the initial image information is being displayed on the touch panel 102, the command issuing unit 103 determines whether the hard key 101 is operated by a user or not (step S4). If it is determined that a user has operated the hard key 101, the command issuing unit 103 issues an operation instruction command corresponding to the operated hard key 101 and supplies it to the information transmitting unit 106 (step S5).

If the operated hard key 101 is the play/pause button 11, the command issuing unit 103 issues a play start command or a pause command on the basis of the current function acceptability state managed by the function acceptability state managing unit 104. If the play/pause button 11 is operated in the state where the initial image information is being displayed, the command issuing unit 103 issues a play start command since the function acceptability state managing unit 104 is set in the play start acceptable state.

The command issuing unit 103 notifies that the play/pause button 11 has been pressed to the function acceptability state managing unit 104. In response to the notification, the function acceptability state managing unit 104 shifts the play/pause button 11 to a play start acceptable state or a pause acceptable state (step S6). If the play/pause button 11 is operated in the state where the initial image information is being displayed, the function acceptability state managing unit 104 shifts the play/pause button 11 from the play start acceptable state to the pause acceptable state.

Next, the information transmitting unit 106 transmits the operation instruction command supplied from the command issuing unit 103 to the external apparatus 200 (step S7). In the external apparatus 200, the information receiving unit 201 determines whether an operation instruction command has been received from the vehicle-mounted apparatus 100 or not (step S8). If the information receiving unit 201 has not received an operation instruction command, the processing by the external apparatus 200 moves to step S20 in FIG. 4. If the information receiving unit 201 has received an operation instruction command on the other hand, the command notifying unit 202 notifies the operation instruction command to the operation executing unit 204 (step S9).

In accordance with the operation instruction command notified from the command notifying unit 202, the operation executing unit 204 executes the operation (music play or pause operation) according to the operation instruction command (step S10). If the operation executing unit 204 has executed the music play operation, the operation executing unit 204 outputs the audio information generated by the music play to the information transmitting unit 206.

The image generating unit 205 generates image information to be displayed on the touch panel 102 of the vehicle-mounted apparatus 100 (step S11). In this case, if the operation executing unit 204 has executed the music play operation, the image generating unit 205 generates image information including the pause button 12 as a soft key. If the operation executing unit 204 has executed the music pause operation, the image generating unit 205 generates image information including the play button 13 as a soft key. The image generating unit 205 outputs the generated image information to the information transmitting unit 206.

The information transmitting unit 206 transmits the audio information supplied from the operation executing unit 204 and image information supplied from the image generating unit 205 to the vehicle-mounted apparatus 100 (step S12).

In this case, if the operation executing unit 204 has executed the music play operation, the information transmitting unit 206 transmits the audio information and image information to the vehicle-mounted apparatus 100. On the other hand, if the operation executing unit 204 has executed the music pause operation, the information transmitting unit 206 transmits only the image information to the vehicle-mounted apparatus 100. The image information is transmitted to the vehicle-mounted apparatus 100 when it is generated by the image generating unit 205.

Next, the operation executing unit 204 determines whether the music play has ended or not (step S13). If the music play has ended, the processing of the flowchart illustrated in FIG. 3 ends. If the music play has not ended on the other hand, the processing returns to step S8.

After the information transmitting unit 106 transmits the operation instruction command to the external apparatus 200 in step S7 above, the audio information and image information transmitted from the external apparatus 200 are received by the information receiving unit 107 (step S14) in the vehicle-mounted apparatus 100. While the operation executing unit 204 in the external apparatus 200 is executing a music pause operation, the information receiving unit 107 receives the image information only.

The image output unit 108 causes the touch panel 102 to display the image information received by the information receiving unit 107 (step S15). If the information receiving unit 107 receives audio information, the audio output unit 109 outputs the audio information to the speaker 110 (step S16). After that, the processing returns to step S4.

In step S4, if it is determined by the command issuing unit 103 that a user has not operated the hard key 101, the pressed position detecting unit 105 determines whether the touch panel 102 has been pressed by a user or not (step S17). If it is determined that the touch panel 102 has not been pressed, the processing returns to step S4. On the other hand, if it is determined that the touch panel 102 has been pressed, the processing by the vehicle-mounted apparatus 100 moves to step S18 in FIG. 4.

In step S18, the pressed position detecting unit 105 detects the pressed position on the touch panel 102. The pressed position detecting unit 105 further converts the detected pressed position information on the touch panel 102 to the pressed position information on an image to be displayed on the touch panel 102. The information transmitting unit 106 then transmits the pressed position information detected by the pressed position detecting unit 105 to the external apparatus 200 (step S19).

In the external apparatus 200, the information receiving unit 201 determines whether the pressed position information from the vehicle-mounted apparatus 100 has been received or not (step S20). If the information receiving unit 201 has not received the pressed position information, the processing in the external apparatus 200 returns to step S8 in FIG. 3. On the other hand, if the information receiving unit 201 has received the pressed position information, the information receiving unit 201 supplies the pressed position information to the command issuing unit 203.

On the basis of the pressed position information supplied from the information receiving unit 201, the command issuing unit 203 issues the operation instruction command corresponding to the pressed position on the touch panel 102 (the pressed position on the image) and notifies it to the operation executing unit 204 (step S21). In accordance with the operation instruction command notified from the command issuing unit 203, the operation executing unit 204 executes an operation according to the operation instruction command (step S22). If the operation executing unit 204 has executed a music play operation, the operation executing unit 204 outputs the audio information generated by the music play to the information transmitting unit 206.

The image generating unit 205 generates image information to be displayed on the touch panel 102 of the vehicle-mounted apparatus 100 (step S23). When the operation executing unit 204 has executed a music play operation, the image generating unit 205 generates image information including the pause button 12 as a soft key. If the operation executing unit 204 has executed a music pause operation, the image generating unit 205 generates image information including the play button 13 as a soft key. The image generating unit 205 outputs the generated image information to the information transmitting unit 206.

The information transmitting unit 206 transmits the audio information supplied from the operation executing unit 204 and image information supplied from the image generating unit 205 to the vehicle-mounted apparatus 100 (step S24). In this case, if the operation executing unit 204 has executed the music play operation, the information transmitting unit 206 transmits the audio information and image information to the vehicle-mounted apparatus 100. On the other hand, if the operation executing unit 204 has executed the music pause operation, the information transmitting unit 206 transmits only the image information to the vehicle-mounted apparatus 100. The image information is transmitted to the vehicle-mounted apparatus 100 when it is generated by the image generating unit 205.

Next, the operation executing unit 204 determines whether the music play has ended or not (step S25). If the music play has ended, the processing of the flowchart illustrated in FIG. 4 ends. If the music play has not ended on the other hand, the processing returns to step S8 in FIG. 3.

After the information transmitting unit 106 transmits the pressed position information to the external apparatus 200 in step S19 above, the audio information and image information transmitted from the external apparatus 200 are received by the information receiving unit 107 (step S26) in the vehicle-mounted apparatus 100. If the operation executing unit 204 in the external apparatus 200 is executing a music pause operation, the information receiving unit 107 receives the image information only.

The image output unit 108 causes the touch panel 102 to display the image information received by the information receiving unit 107 (step S27). If the information receiving unit 107 receives audio information the audio output unit 109 outputs the audio information to the speaker 110 (step S28).

Next, on the basis of the change of the state of the audio information received by the information receiving unit 107, the operation determining unit 111 determines whether the press on the touch panel 102 has been an operation on the pause button 12 or play button 13 (step S29). In other words, if the information receiving unit 107 has changed from an audio information receiving state to a non-receiving state, the operation determining unit 111 determines that the press on the touch panel 102 has been an operation on the pause button 12. On the other hand, if the information receiving unit 107 has changed from the audio information non-receiving state to the receiving state, the operation determining unit 111 determines that the press on the touch panel 102 has been an operation on the play button 13.

If it is determined by the operation determining unit 111 that the press on the touch panel 102 has been an operation on the pause button 12 or play button 13, the state transition unit 112 shifts the function acceptability state of the play/pause button 11 (step S30). In other words, if it is determined by the operation determining unit 111 that the press on the touch panel 102 has been an operation on the pause button 12, the state transition unit 112 shifts the function acceptability state of the play/pause button 11 managed by the function acceptability state managing unit 104 from a pause acceptable state to a play start acceptable state. On the other hand, if is determined by the operation determining unit 111 that the press on the touch panel 102 has been an operation on the play button 13, the state transition unit 112 shifts the function acceptability state of the play/pause button 11 managed function acceptability state managing unit 104 from the play start acceptable state to the pause acceptable state. After that, the processing in the vehicle-mounted apparatus 100 returns to step S4 in FIG. 3.

As described in detail above, according to the first embodiment, whether the press on the touch panel 102 has been an operation on the pause button 12 or the play button 13 as a soft key is determined on the basis of the change of the output state of audio information transmitted from the external apparatus 200 to the vehicle-mounted apparatus 100 in response to the press on the touch panel 102 in the state where soft keys are displayed on the basis of image information transmitted from the external apparatus 200 to the vehicle-mounted apparatus 100. If it is determined that the operation corresponds to an operation on the pause button 12 or play button 13, the function acceptability state of the play/pause button 11 of the hard key 101 is shifted to the play start acceptable state or pause acceptable state.

According to the first embodiment configured as described above, when a soft key (pause button 12 or play button 13) corresponding to the play/pause button 11 is pressed, the fact is detected by the operation determining unit 111, and the function acceptability state of the play/pause button 11 is shifted by the state transition unit 112, even without actually operating one hard key 101 (play/pause button 11) to which a plurality of functions such as music play start and pause functions are assigned.

Because soft keys are displayed on the basis of the image information transmitted from the external apparatus 200 to the vehicle-mounted apparatus 100, it may be securely detected that the soft key corresponding to the play/pause button 11 has been pressed, and the function acceptability state of the play/pause button 11 may be shifted to a correct state even when whether a soft key has been operated or not may not be determined from the pressed position on the touch panel 102. Thus, the external apparatus 200 may be caused to execute a correct operation in either case where a hard key (play/pause button 11) is operated or a soft key (pause button 12 or play button 13) is operated.

Second Embodiment

Figure 5:
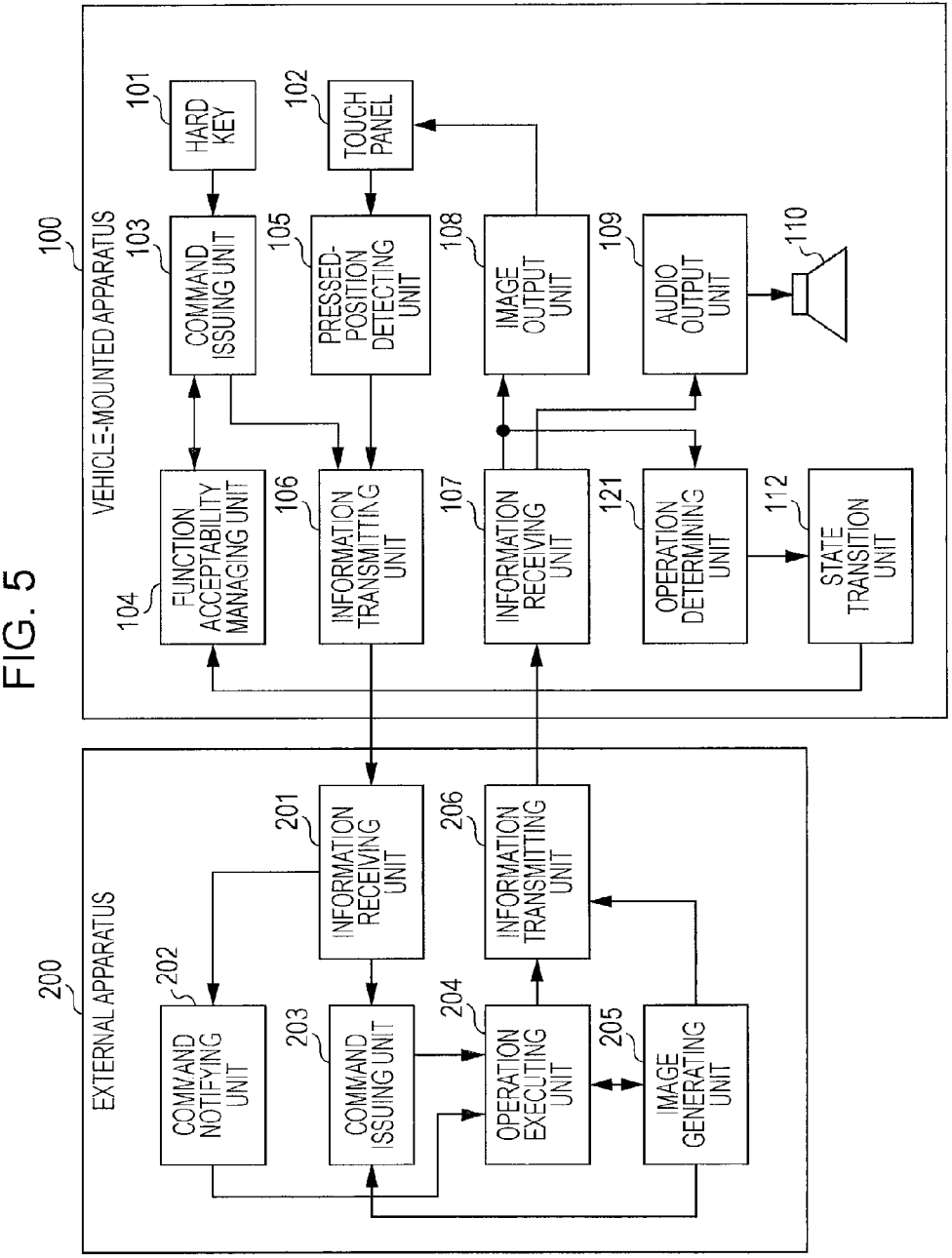
FIG. 5 is a block diagram illustrating functional components of an exemplary system including an operation control apparatus according to a second embodiment.

Next, a second embodiment of the present invention will be described with reference to the attached drawings. FIG. 5 is a block diagram illustrating functional components of an exemplary system including an operation control apparatus according to a second embodiment. In FIG. 5, like reference numerals indicate parts having similar functions to those in FIG. 1, and repetitive descriptions will be omitted.

As illustrated in FIG. 5, according to the second embodiment, the vehicle-mounted apparatus 100 includes an operation determining unit 121 instead of the operation determining unit 111. On the basis of the image information transmitted from the external apparatus 200 as a result of transmission of the pressed position information from the information transmitting unit 106 to the external apparatus 200 in accordance with a press on the touch panel 102, the operation determining unit 121 determines whether the press on the touch panel 102 has been an operation on the pause button 12 or play button 13.

For example, the operation determining unit 121 image-recognizes a soft key included in image information transmitted from the external apparatus 200 to determine whether the press on the touch panel 102 has been an operation on the pause button 12 or play button 13. In this case, if the soft key included in the image information is image-recognized as the pause button 12, the operation determining unit 121 determines that the press on the touch panel 102 has been an operation on the play button 13. On the other hand, if it is image-recognized that the soft key included in the image information is the play button 13, the operation determining unit 121 determines that the press on the touch panel 102 has been an operation on the pause button 12.

In other words, when the play button 13 displayed on the touch panel 102 is pressed, the pressed position information at that time is transmitted to the external apparatus 200. The operation executing unit 204 executes a music play operation, and the image generating unit 205 generates image information including the pause button 12. The image information is transmitted from the external apparatus 200 to the vehicle-mounted apparatus 100. Thus, if the operation determining unit 121 determines that the soft key included in the image information is the pause button 12 by the image recognition, the press on the touch panel 102 determines that the play button 13 has been operated.

If the pause button 12 displayed on the touch panel 102 is pressed, the pressed position information at that time is transmitted to the external apparatus 200. The operation executing unit 204 executes a music pause operation, and the image generating unit 205 generates image information including the play button 13. The image information is then transmitted from the external apparatus 200 to the vehicle-mounted apparatus 100. Therefore, if the operation determining unit 121 determines that the soft key included in the image information is the play button 13 by image recognition, it may be determined that press on the touch panel 102 has been an operation on the pause button 12.

Notably, the subject of the image-recognition according to the second embodiment is not limited to a soft key within image information. For example, the operation determining unit 121 may image-recognize time information included in image information transmitted from the external apparatus 200 to determine whether the time information has changed or not and thus determine whether the press on the touch panel 102 has been an operation on the pause button 12 or play button 13. In this case, the image generating unit 205 in the external apparatus 200 generates not only the time when an operation instruction command or pressed position information has been transmitted from the vehicle-mounted apparatus 100 (or the time when the execution state of the operation executing unit 204 has changed), but also image information as required, and supplies them to the information transmitting unit 206.

Figure 6:
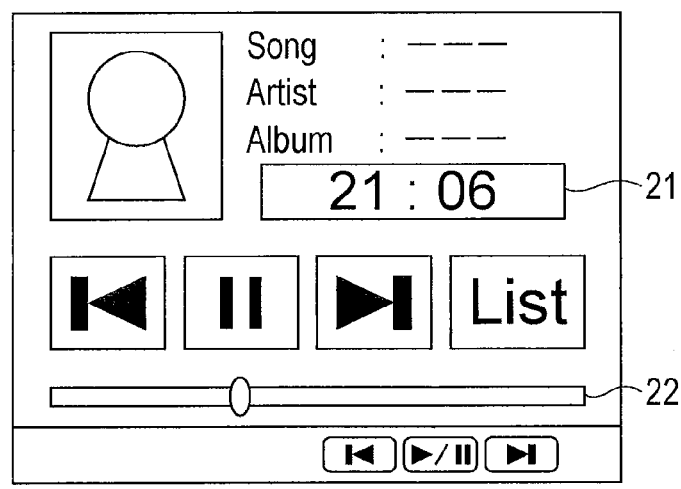
FIG. 6 illustrates a variation example of image information to undergo an image recognition according to the second embodiment.

FIG. 6 illustrates a variation example of image information to undergo the image recognition according to the second embodiment. As illustrated in FIG. 6, in some cases, counter information 21 describing a music play time or time information with a time bar 22 may be included in the image information. During a music play, the time information is always changing. On the other hand, during a pause, the time information does not change. Thus, the operation determining unit 121 may determine whether the time information is changing or not by performing image recognition to determine whether the press on the touch panel 102 has been an operation on the pause button 12 or play button 13.

In other words, if the play button 13 displayed on the touch panel 102 is pressed, the pressed position information at that time is transmitted to the external apparatus 200. The operation executing unit 204 executes a music play operation, and the image generating unit 205 generates image information including the time information. The image information is transmitted from the external apparatus 200 to the vehicle-mounted apparatus 100. During a music play, image information including updated time information is generated as required and is transmitted to the vehicle-mounted apparatus 100. Thus, the operation determining unit 121 may determine that the time information included in the image information has changed by performing image recognition to determine whether the press on the touch panel 102 has been an operation on the play button 13 or not.

If the pause button 12 displayed on the touch panel 102 is pressed, the pressed position information at that time is transmitted to the external apparatus 200. The operation executing unit 204 executes a pause operation, and the image generating unit 205 generates image information including the time information. The image information is transmitted from the external apparatus 200 to the vehicle-mounted apparatus 100. However, while music is paused, the time information is fixed without any changes. Thus, when the operation determining unit 121 may determine that the time information included in the image information has not changed by performing image recognition, it may be determined that the press on the touch panel 102 has been an operation on the pause button 12.

Notably, during a music pause, the image generating unit 205 may be inhibited to generate image information after the image generating unit 205 generates image information including a soft key updated from the pause button 12 to the play button 13 until the next music play operation is restarted. In this case, during a music play, the information receiving unit 107 receives image information (including updated time information) as required. On the other hand, during a music pause, the information receiving unit 107 only receives image information when the soft key is updated. Accordingly, the operation determining unit 121 may check whether the information receiving unit 107 receives image information as required or not to determine whether the press on the touch panel 102 has been an operation on the pause button 12 or play button 13.

As described above in detail, according to the second embodiment, when the touch panel 102 displaying a soft key on the basis of image information transmitted from the external apparatus 200 to the vehicle-mounted apparatus 100 is pressed, whether the press on the touch panel 102 has been an operation on the pause button 12 or play button 13 as a soft key may be determined on the basis of the image information transmitted from the external apparatus 200 to the vehicle-mounted apparatus 100 in accordance with the press. If it is determined that the press corresponds to an operation on the pause button 12 or play button 13, the function acceptability state of the play/pause button 11 that is the hard key 101 is shifted from a play start acceptable state to a pause acceptable state.

Also according to the second embodiment configured as described above, like the first embodiment, when a soft key (pause button 12 or play button 13) corresponding to the play/pause button 11 is pressed, it is detected by the operation determining unit 121, and the function acceptability state of the play/pause button 11 is shifted by the state transition unit 112 even though one hard key 101 (play/pause button 11) to which a plurality of functions such as music play start and pause functions are assigned is not actually operated.

A soft key is displayed on the basis of the image information transmitted from the external apparatus 200 to the vehicle-mounted apparatus 100. Thus, it may be securely detected that the soft key corresponding to the play/pause button 11 has been pressed, and the function acceptability state of the play/pause button 11 may be shifted to a correct state even when it is difficult to immediately grasp whether a soft key has been operated or not from the pressed position on the touch panel 102. This allows the external apparatus 200 to implement a correct operation in either case where a hard key (play/pause button 11) is operated or a soft key (pause button 12 or play button 13) is operated.

Third Embodiment

Figure 7:
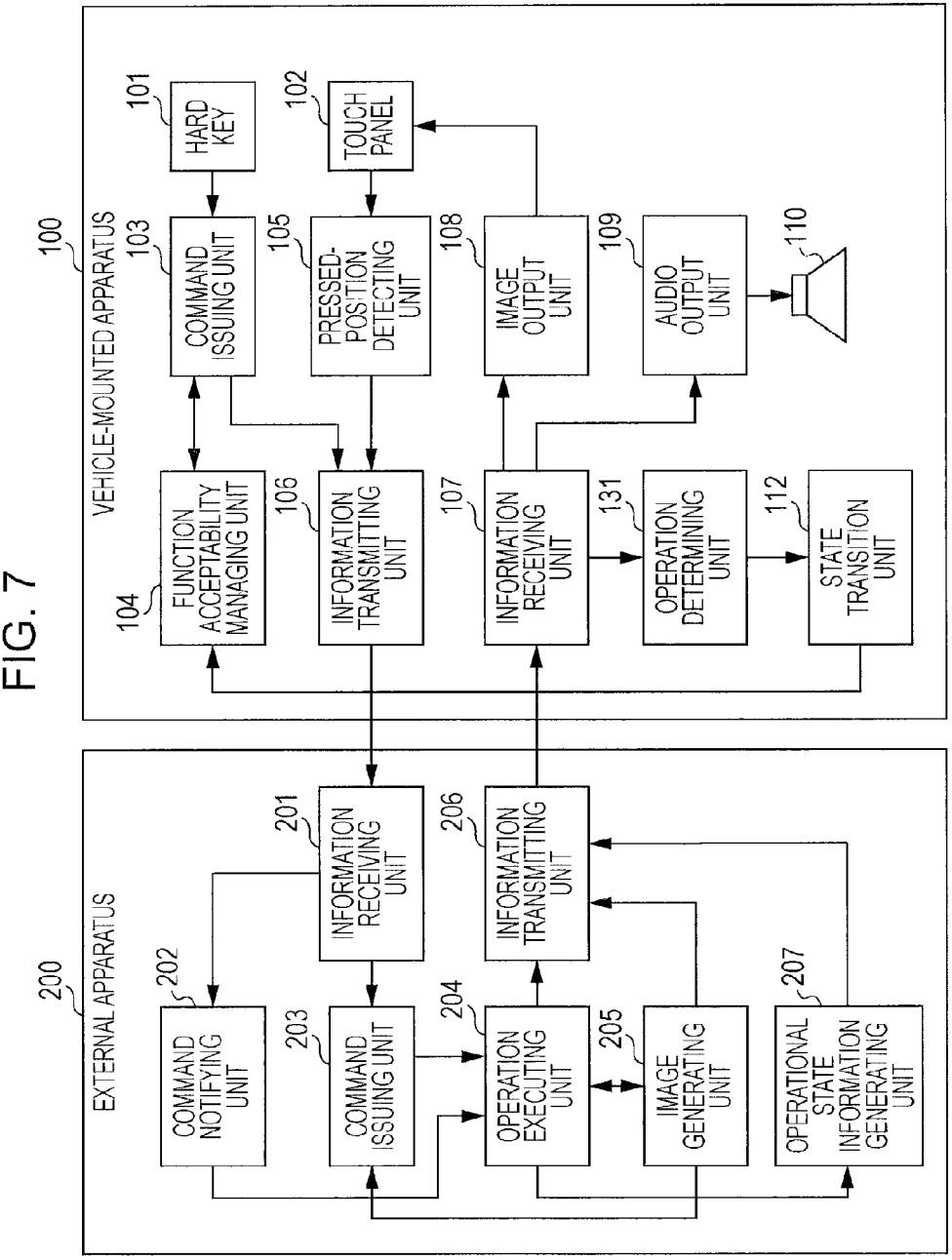
FIG. 7 is a block diagram illustrating functional components of an exemplary system including an operation control apparatus according to a third embodiment.

Next, a third embodiment of the present invention will be described with the attached drawings. FIG. 7 is a block diagram illustrating functional components of an exemplary system including an operation control apparatus according to a third embodiment of the present invention. In FIG. 7, like reference numerals indicate parts having similar functions to those in FIG. 1, and repetitive descriptions will be omitted.

As illustrated in FIG. 7, according to the third embodiment, the external apparatus 200 further includes an operational state information generating unit 207. The vehicle-mounted apparatus 100 includes an operation determining unit 131 instead of the operation determining unit 111.

The operational state information generating unit 207 generates operational state information describing an operational state (whether a music play operation is being executed or in pause) of the operation executing unit 204 and supplies it to the information transmitting unit 206. The information transmitting unit 206 transmits to the vehicle-mounted apparatus 100 the operational state information supplied from the operational state information generating unit 207 in addition to audio information supplied from the operation executing unit 204 and image information supplied from the image generating unit 205.

On the basis of operational state information transmitted from the external apparatus 200 as a result of transmission of the pressed position information from the information transmitting unit 206 to the external apparatus 200, the operation determining unit 131 in the vehicle-mounted apparatus 100 determines whether the press on the touch panel 102 has been an operation on a pause button 12 or a play button 13.

In other words, if the operational state information transmitted from the external apparatus 200 describes that a music play operation is being performed, the operation determining unit 131 determines that the press on the touch panel 102 has been an operation on the play button 13. On the other hand, if the operational state information transmitted from the external apparatus 200 describes that music is in pause, the operation determining unit 131 determines that the press on the touch panel 102 has been an operation on the pause button 12.

As described above in detail, according to the third embodiment, when the touch panel 102 displaying a soft key on the basis of image information transmitted from the external apparatus 200 to the vehicle-mounted apparatus 100 is pressed, the press on the touch panel 102 may determine whether the press has been an operation on the pause button 12 or play button 13 as a soft key on the basis of the operational state information transmitted from the external apparatus 200 to the vehicle-mounted apparatus 100 in accordance with the press. If it is determined that the press corresponds to an operation on the pause button 12 or play button 13, the function acceptability state of the play/pause button 11 that is the hard key 101 is shifted from a play start acceptable state to a pause acceptable state.

Also according to the third embodiment configured as described above, like the first embodiment, when a soft key (pause button 12 or play button 13) corresponding to the play/pause button 11 is pressed, it is detected by the operation determining unit 131, and the function acceptability state of the play/pause button 11 is shifted by the state transition unit 112 even though one hard key 101 (play/pause button 11) to which a plurality of functions such as music play start and pause functions are assigned is not actually operated.

A soft key is displayed on the basis of the image information transmitted from the external apparatus 200 to the vehicle-mounted apparatus 100. Thus, it may be securely detected that the soft key corresponding to the play/pause button 11 has been pressed, and the function acceptability state of the play/pause button 11 may be shifted to a correct state even when it is difficult to immediately grasp whether a soft key has been operated or not from the pressed position on the touch panel 102. This allows the external apparatus 200 to implement a correct operation in either case where a hard key (play/pause button 11) is operated or a soft key (pause button 12 or play button 13) is operated.

Fourth Embodiment

Figure 8:
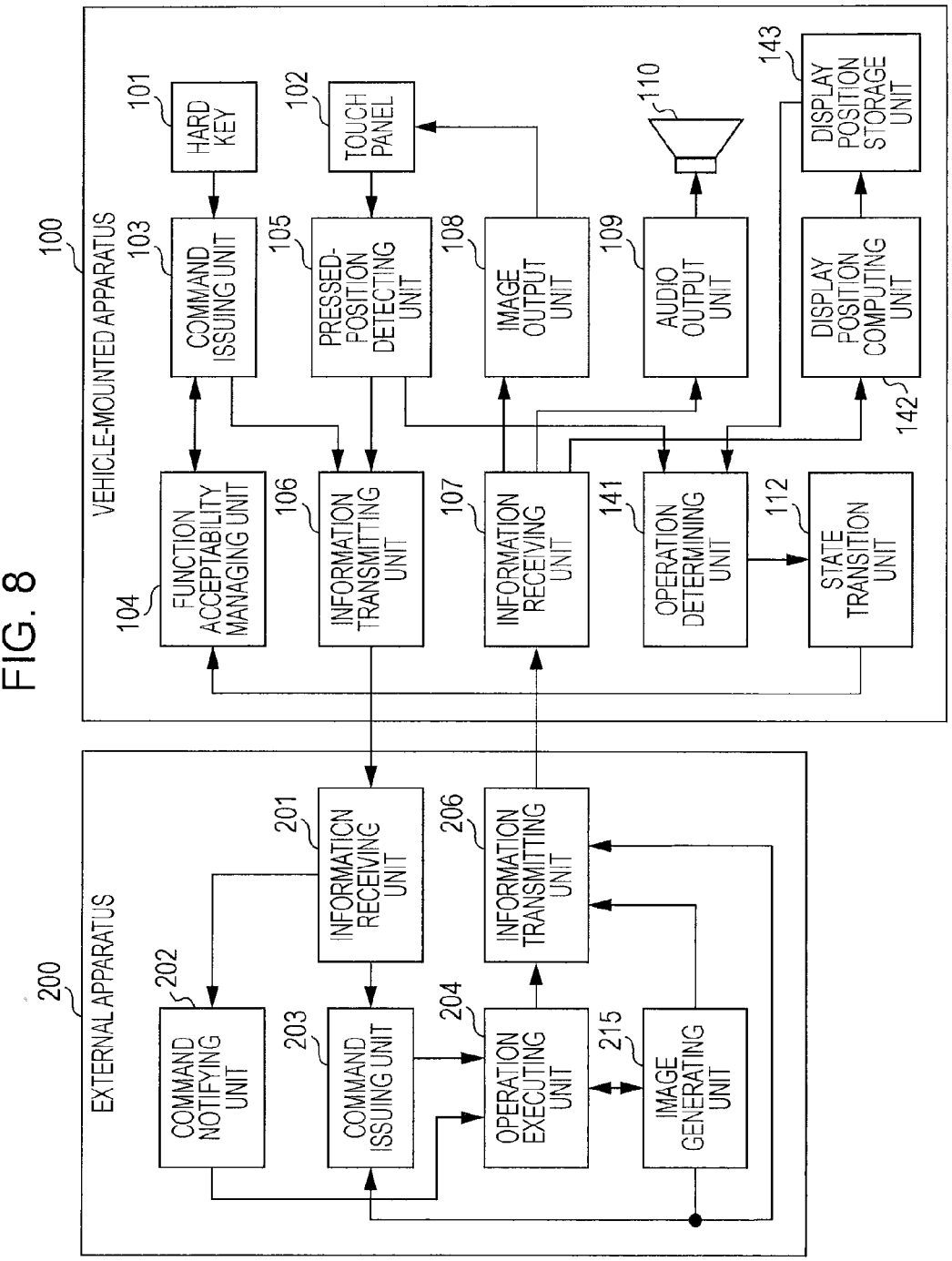
FIG. 8 is a block diagram illustrating functional components of an exemplary system including an operation control apparatus according to a fourth embodiment.

Next, a fourth embodiment of the present invention will be described with the attached drawings. FIG. 8 is a block diagram illustrating functional components of an exemplary system including an operation control apparatus according to a fourth embodiment of the present invention. In FIG. 8, like reference numerals indicate parts having similar functions to those in FIG. 1, and repetitive descriptions will be omitted.

As illustrated in FIG. 8, according to the fourth embodiment, the vehicle-mounted apparatus 100 includes an operation determining unit 141 instead of the operation determining unit 111. According to the fourth embodiment, the vehicle-mounted apparatus 100 further includes a display position computing unit 142 and a display position storage unit 143. The external apparatus 200 includes an image generating unit 215 instead of the image generating unit 205.

The image generating unit 215 generates image information to be displayed on the touch panel 102 of the vehicle-mounted apparatus 100 and supplies it to the information transmitting unit 206. The image generating unit 215 outputs a soft key included in the generated image information and soft key information describing its position to a command issuing unit 203 and outputs the soft key positional information to the information transmitting unit 206. The information transmitting unit 206 transmits the audio information supplied from the operation executing unit 204 and the image information and soft key positional information supplied from the image generating unit 205 to the vehicle-mounted apparatus 100.

An information receiving unit 107 in the vehicle-mounted apparatus 100 receives the audio information and image information transmitted from the external apparatus 200 and soft key positional information. A display position computing unit 142 converts the soft key positional information (coordinate information) received by the information receiving unit 107 to display positional information (coordinate information) describing the position on the touch panel 102 displaying a soft key for a pause button 12 or play button 13 and stores it in the display position storage unit 143.

In this case, the display position computing unit 142 preholds a correspondence relationship between positional information (coordinate information) on an image and positional information (coordinate information) on the touch panel 102 and, on the basis of the information, computes from the soft key positional information to display positional information. As described above, the image output unit 108 preholds information describing a correspondence relationship between positional information (coordinate information) on an image and positional information (coordinate information) on the touch panel 102. With reference to the information, the display position computing unit 142 may compute the display positional information.

On the basis of the display positional information stored in the display position storage unit 143 and pressed position information detected by the pressed position detecting unit 105 (pressed position information transmitted from the information transmitting unit 106 to the external apparatus 200), the operation determining unit 141 determines whether the press on the touch panel 102 has been an operation on the pause button 12 or play button 13.

In other words, if the pressed position on the touch panel 102 indicated by the pressed position information detected by the pressed position detecting unit 105 corresponds to the display position of the soft key (pause button 12 or play button 13) on the touch panel 102 indicated by the display positional information stored in the display position storage unit 143, the operation determining unit 141 determines that the press on the touch panel 102 has been an operation on the pause button 12 or play button 13.

Figure 9:
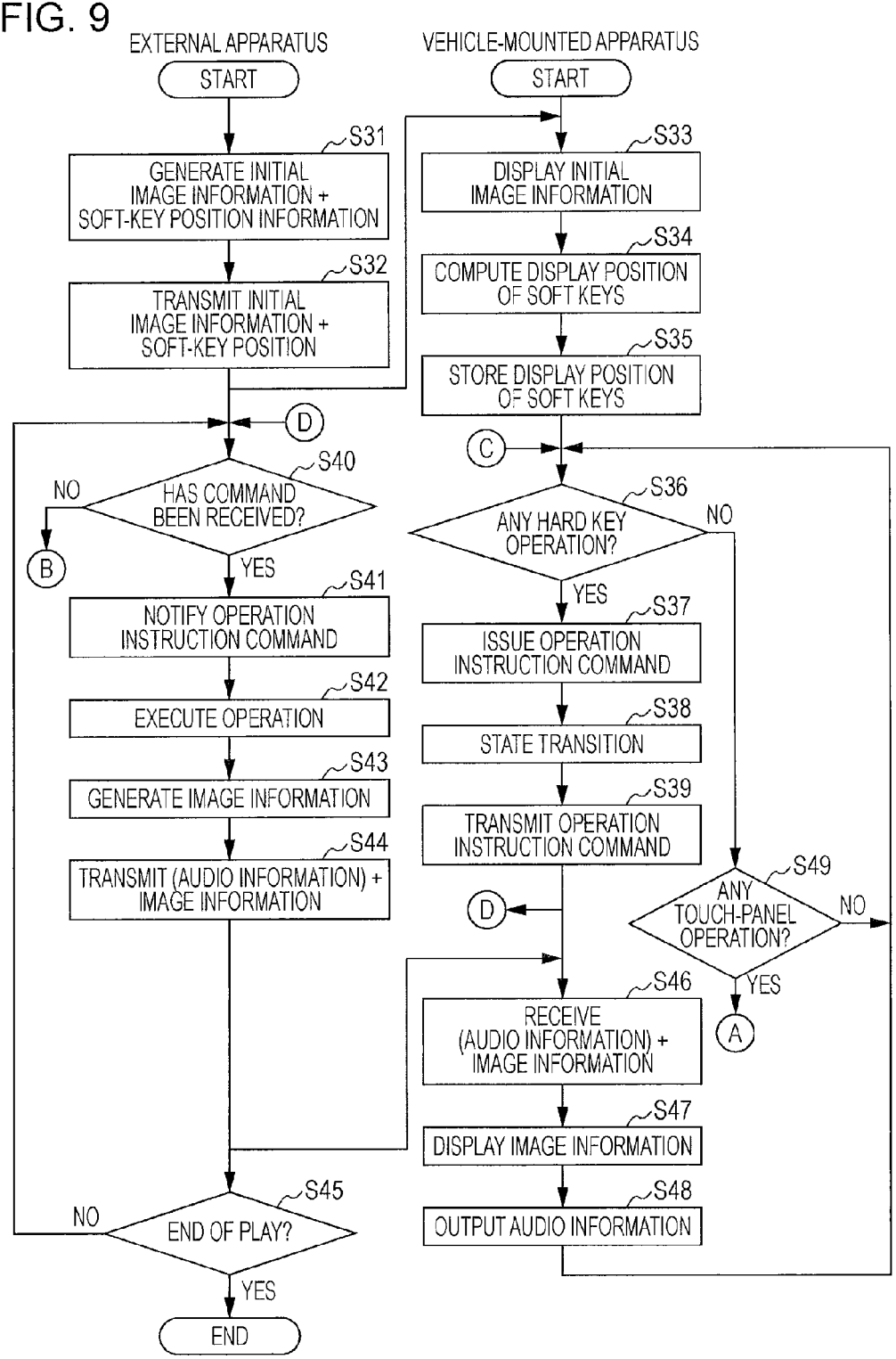
FIG. 9 is a flowchart illustrating an operation example of a system including an operation control apparatus according to the fourth embodiment.
Figure 10:
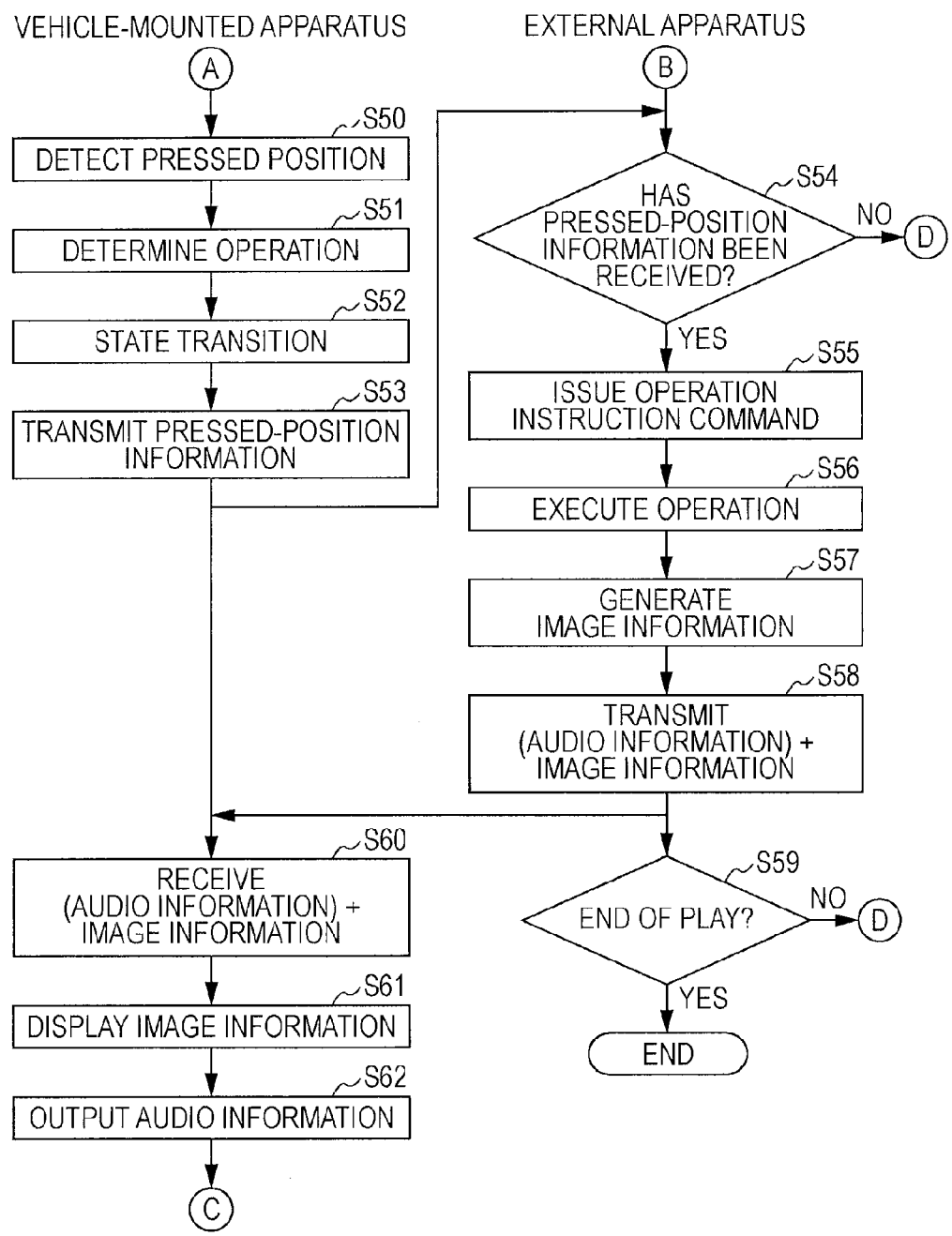
FIG. 10 is a flowchart illustrating an operation example of a system including an operation control apparatus according to the fourth embodiment.
Figure 11A:
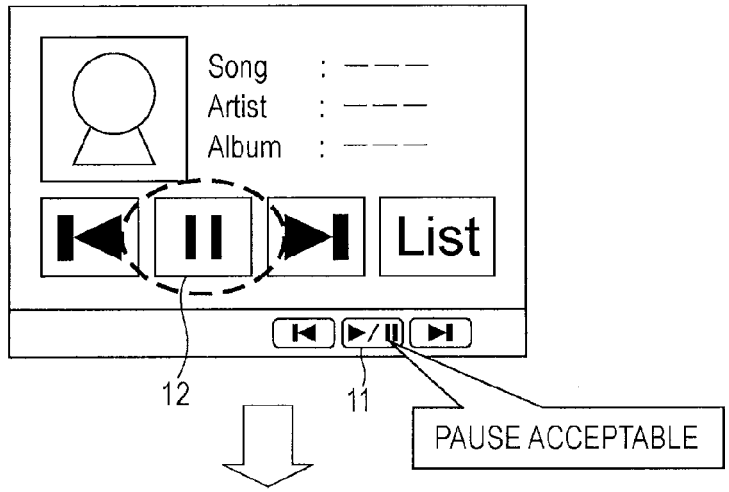
FIGS. 11A to 11C are diagrams illustrating a conventional malfunction and illustrating transitions of a display state of a soft key and a function acceptability state of a hard key.
Figure 11B:
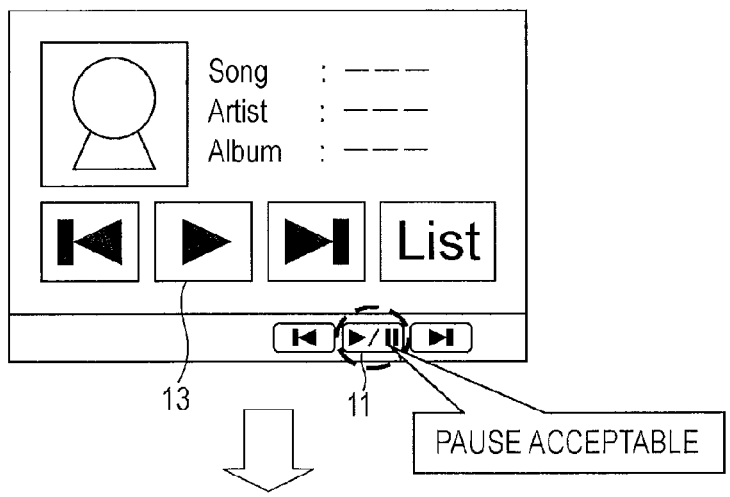
Figure 11C:
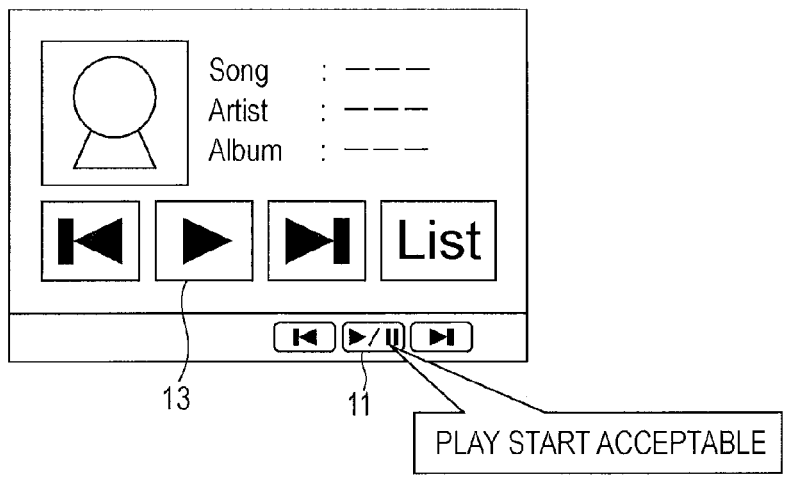

FIG. 9 and FIG. 10 are flowcharts illustrating operation examples of a system including an operation control apparatus according to the fourth embodiment. The flowchart illustrated in FIG. 9 starts when the vehicle-mounted apparatus 100 and the external apparatus 200 are connected, and the vehicle-mounted apparatus 100 instructs a music play operation in the external apparatus 200 (for example, when an application for playing music is started). At the time of the start of the processing illustrated in FIG. 9, it is assumed that the function acceptability state managing unit 104 initially sets the play/pause button 11 in a play start acceptable state.

Referring to FIG. 9, the image generating unit 215 in the external apparatus 200 first generates initial image information including the play button 13 as one of soft keys and soft key position information (step S31). The information transmitting unit 206 transmits the initial image information and soft key position information to the vehicle-mounted apparatus 100 (step S32). In the vehicle-mounted apparatus 100, the information receiving unit 107 receives the initial image information transmitted from the external apparatus 200, and the image output unit 108 displays it on the touch panel 102 (step S33).

The display position computing unit 142 converts the soft key positional information received by the information receiving unit 107 to display positional information describing the position on the touch panel 102 displaying a soft key for the pause button 12 or play button 13 (step S34) and stores the display positional information in the display position storage unit 143 (step S35).

In the state that the initial image information is being displayed on the touch panel 102, the command issuing unit 103 determines whether the hard key 101 is operated by a user or not (step S36). If it is determined that a user has operated the hard key 101, the command issuing unit 103 issues an operation instruction command corresponding to the operated hard key 101 and supplies it to the information transmitting unit 106 (step S37).

If the operated hard key 101 is the play/pause button 11, the command issuing unit 103 issues a play start command or a pause command on the basis of the current function acceptability state managed by the function acceptability state managing unit 104. If the play/pause button 11 is operated in the state where the initial image information is being displayed, the command issuing unit 103 issues a play start command since the function acceptability state managing unit 104 is set in the play start acceptable state.

The command issuing unit 103 notifies that the play/pause button 11 has been pressed to the function acceptability state managing unit 104. In response to the notification, the function acceptability state managing unit 104 shifts the play/pause button 11 to a play start acceptable state or a pause acceptable state (step S38). If the play/pause button 11 is operated in the state where the initial image information is being displayed, the function acceptability state managing unit 104 shifts the play/pause button 11 from the play start acceptable state to the pause acceptable state.

Next, the information transmitting unit 106 transmits the operation instruction command supplied from the command issuing unit 103 to the external apparatus 200 (step S39). In the external apparatus 200, the information receiving unit 201 determines whether an operation instruction command has been received from the vehicle-mounted apparatus 100 or not (step S40). If the information receiving unit 201 has not received an operation instruction command, the processing by the external apparatus 200 moves to step S54 in FIG. 10. If the information receiving unit 201 has received an operation instruction command on the other hand, the command notifying unit 202 notifies the operation instruction command to the operation executing unit 204 (step S41).

In accordance with the operation instruction command notified from the command notifying unit 202, the operation executing unit 204 executes the operation (music play or pause operation) according to the operation instruction command (step S42). If the operation executing unit 204 has executed the music play operation, the operation executing unit 204 outputs the audio information generated by the music play to the information transmitting unit 206.

The image generating unit 215 generates image information to be displayed on the touch panel 102 of the vehicle-mounted apparatus 100 (step S41). In this case, if the operation executing unit 204 has executed the music play operation, the image generating unit 215 generates image information including the pause button 12 as a soft key. If the operation executing unit 204 has executed the music pause operation, the image generating unit 215 generates image information including the play button 13 as a soft key. The image generating unit 215 outputs the generated image information to the information transmitting unit 206.

The information transmitting unit 206 transmits the audio information supplied from the operation executing unit 204 and image information supplied from the image generating unit 215 to the vehicle-mounted apparatus 100 (step S44). In this case, if the operation executing unit 204 has executed the music play operation, the information transmitting unit 206 transmits the audio information and image information to the vehicle-mounted apparatus 100. On the other hand, if the operation executing unit 204 has executed the music pause operation, the information transmitting unit 206 transmits only the image information to the vehicle-mounted apparatus 100. The image information is transmitted to the vehicle-mounted apparatus 100 when it is generated by the image generating unit 215.

Next, the operation executing unit 204 determines whether the music play has ended or not (step S45). If the music play has ended, the processing of the flowchart illustrated in FIG. 9 ends. If the music play has not ended on the other hand, the processing in the external apparatus 200 returns to step S8.

After the information transmitting unit 106 transmits the operation instruction command to the external apparatus 200 in step S39 above, the audio information and image information transmitted from the external apparatus 200 are received by the information receiving unit 107 (step S46) in the vehicle-mounted apparatus 100. While the operation executing unit 204 in the external apparatus 200 is executing a music pause operation, the information receiving unit 107 receives the image information only.

The image output unit 108 causes the touch panel 102 to display the image information received by the information receiving unit 107 (step S47). If the information receiving unit 107 receives audio information, the audio output unit 109 outputs the audio information to the speaker 110 (step S48). After that, the processing in the vehicle-mounted apparatus 100 returns to step S36.

In step S36, if it is determined by the command issuing unit 103 that a user has not operated the hard key 101, the pressed position detecting unit 105 determines whether the touch panel 102 has been pressed by a user or not (step S49). If it is determined that the touch panel 102 has not been pressed, the processing in the vehicle-mounted apparatus 100 returns to step S36. On the other hand, if it is determined that the touch panel 102 has been pressed, the processing in the vehicle-mounted apparatus 100 moves to step S50 in FIG. 10.

In step S50, the pressed position detecting unit 105 detects the pressed position on the touch panel 102. The pressed position detecting unit 105 further converts the detected pressed position information on the touch panel 102 to the pressed position information on an image to be displayed on the touch panel 102. The pressed position detecting unit 105 then supplies to the thus generated pressed position information on the image to the information transmitting unit 106 and supplies the pressed position information on the touch panel 20 to the operation determining unit 141.

On the basis of the display positional information stored in the display position storage unit 143 in step S35 in FIG. 9 and the pressed position information detected by the pressed position detecting unit 105 in step S50 in FIG. 10, the operation determining unit 141 determines whether the press on the touch panel 102 has been an operation on the pause button 12 or play button 13 (step S51).

If it is determined by the operation determining unit 141 that the press on the touch panel 102 has been an operation on the pause button 12 or play button 13, the state transition unit 112 shifts the function acceptability state of the play/pause button 11 (step S52). In other words, if it is determined by the operation determining unit 141 that the press on the touch panel 102 has been an operation on the pause button 12, the state transition unit 112 shifts the function acceptability state of the play/pause button 11 managed by the function acceptability state managing unit 104 from a pause acceptable state to a play start acceptable state. On the other hand, if it is determined by the operation determining unit 141 that the press on the touch panel 102 has been an operation on the play button 13, the state transition unit 112 shifts the function acceptability state of the play/pause button 11 managed by the function acceptability state managing unit 104 from the play start acceptable state to the pause acceptable state.

After that, the information transmitting unit 106 then transmits the pressed position information detected by the pressed position detecting unit 105 to the external apparatus 200 (step S53). In the external apparatus 200, the information receiving unit 201 determines whether the pressed position information from the vehicle-mounted apparatus 100 has been received or not (step S54). If the information receiving unit 201 has not received the pressed position information, the processing in the external apparatus 200 returns to step S40 in FIG. 9. On the other hand, if the information receiving unit 201 has received the pressed position information, the information receiving unit 201 supplies the pressed position information to the command issuing unit 203.

On the basis of the pressed position information supplied from the information receiving unit 201, the command issuing unit 203 issues the operation instruction command corresponding to the pressed position on the touch panel 102 (the pressed position on the image) and notifies it to the operation executing unit 204 (step S55). In accordance with the operation instruction command notified from the command issuing unit 203, the operation executing unit 204 executes an operation according to the operation instruction command (step S56). If the operation executing unit 204 has executed a music play operation, the operation executing unit 204 outputs the audio information generated by the music play to the information transmitting unit 206.

The image generating unit 215 generates image information to be displayed on the touch panel 102 of the vehicle-mounted apparatus 100 (step S57). When the operation executing unit 204 has executed a music play operation, the image generating unit 215 generates image information including the pause button 12 as a soft key. If the operation executing unit 204 has executed a music pause operation, the image generating unit 215 generates image information including the play button 13 as a soft key. The image generating unit 215 outputs the generated image information to the information transmitting unit 206.

The information transmitting unit 206 transmits the audio information supplied from the operation executing unit 204 and image information supplied from the image generating unit 215 to the vehicle-mounted apparatus 100 (step S58). In this case, if the operation executing unit 204 has executed the music play operation, the information transmitting unit 206 transmits the audio information and image information to the vehicle-mounted apparatus 100. On the other hand, if the operation executing unit 204 has executed the music pause operation, the information transmitting unit 206 transmits only the image information to the vehicle-mounted apparatus 100. The image information is transmitted to the vehicle-mounted apparatus 100 when it is generated by the image generating unit 215.

Next, the operation executing unit 204 determines whether the music play has ended or not (step S59). If the music play has ended, the processing of the flowchart illustrated in FIG. 10 ends. If the music play has not ended on the other hand, the processing in the external apparatus 200 returns to step S40 in FIG. 9.

After the information transmitting unit 106 transmits the pressed position information to the external apparatus 200 in step S53 above, the audio information and image information transmitted from the external apparatus 200 are received by the information receiving unit 107 (step S60) in the vehicle-mounted apparatus 100. If the operation executing unit 204 in the external apparatus 200 is executing a music pause operation, the information receiving unit 107 receives the image information only.

The image output unit 108 causes the touch panel 102 to display the image information received by the information receiving unit 107 (step S61). If the information receiving unit 107 receives audio information the audio output unit 109 outputs the audio information to the speaker 110 (step S62).

Referring to the flowcharts described above, in the external apparatus 200, only at the first time when initial image information is generated and is transmitted to the vehicle-mounted apparatus 100, the image information and soft key positional information are transmitted to the vehicle-mounted apparatus 100 and, in the vehicle-mounted apparatus 100, are converted to the display positional information on the touch panel 102, which is then stored in the display position storage unit 143. This is because the pause button 12 and play button 13 are displayed alternately at an identical position within the image information and the soft key positional information may be fixed.

If image information in which the position of the pause button 12 and the position of the play button 13 are differentiated is generated, the image generating unit 215 also transmits soft key positional information to the vehicle-mounted apparatus 100 every time image information is generated. In the vehicle-mounted apparatus 100, the display positional information generated from the soft key positional information may be stored in the display position storage unit 143 each time.

As described above in detail, according to the fourth embodiment, display positional information describing the position where the pause button 12 or play button 13 as a soft key is displayed on the touch panel 102 is pre-stored in the display position storage unit 143 in the vehicle-mounted apparatus 100. If the pressed position on the touch panel 102 detected by the pressed position detecting unit 105 corresponds to the display position of the soft key on the touch panel 102, which is stored in the display position storage unit 143, it is determined that the press on the touch panel 102 has been an operation on the pause button 12 or play button 13. If it is determined that the operation corresponds to an operation on the pause button 12 or play button 13, the function acceptability state of the play/pause button 11 is shifted to the play start acceptable state or pause acceptable state.

According to the fourth embodiment configured as described above, like the first embodiment, when a soft key (pause button 12 or play button 13) corresponding to the play/pause button 11 is pressed, the fact is detected by the operation determining unit 141, and the function acceptability state of the play/pause button 11 is shifted by the state transition unit 112, even without actually operating one hard key 101 (play/pause button 11) to which a plurality of functions such as music play start and pause functions are assigned.

Because soft keys are displayed on the basis of the image information transmitted from the external apparatus 200 to the vehicle-mounted apparatus 100, it may be securely detected that the soft key corresponding to the play/pause button 11 has been pressed, and the function acceptability state of the play/pause button 11 may be shifted to a correct state even when whether a soft key has been operated or not may not be determined from the pressed position on the touch panel 102. Thus, the external apparatus 200 may be caused to execute a correct operation in either case where a hard key (play/pause button 11) is operated or a soft key (pause button 12 or play button 13) is operated.

Moreover, according to the fourth embodiment, in the external apparatus 200, image information is generated, and soft key positional information describing the position of the soft key included in the image information is then transmitted to the vehicle-mounted apparatus 100. In vehicle-mounted apparatus 100, the soft key positional information is converted to display positional information on the touch panel 102 and is stored in the display position storage unit 143. This allows the external apparatus 200 connected to the vehicle-mounted apparatus 100 to correctly detect that the soft key has been operated even when the position of the soft key (pause button 12 or play button 13) arranged within image information is different.

Having described according to the first to fourth embodiments, the play/pause button 11 is an example of the one hard key 101 to which a plurality of functions are assigned, the present invention is not limited thereto. The present invention is applicable, for example, in a case where one mute button is used for switching a mute function on and off or a case where one power button is used to switch a power supply on and off.

For example, the present invention is applicable in a case where one mute button is provided as the hard key 101, and a mute ON button and a mute OFF button as soft keys are alternately displayed. When the first embodiment is applied to that case, the operation determining unit 111 determines that the press on the touch panel 102 has been an operation on the mute ON button if audio information has changed from an output state to a stop state. On the other hand, the press on the touch panel 102 is determined as an operation on the mute OFF button if the audio information has changed from the stop state to the output state.

Having described according to the first to fourth embodiments that a plurality of functions to be used in one application are assigned to one hard key 101, the present invention is not limited thereto. In other words, the present invention is also applicable to a case where a plurality of functions to be used in a plurality of applications is assigned to one hard key 101. For example, when an application for music play described according to any of the first to fourth embodiments and a navigation application for route guidance are provided in the external apparatus 200, a music play function and a present location display function on a navigation map may be assigned to one hard key 101. Also in this case, the present invention is applicable thereto.

The first to fourth embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

It is therefore intended that the foregoing detailed description be regarded as illustrative rather than limiting, and that it be understood that it is the following claims, including all equivalents, that are intended to define the spirit and scope of this invention.

What is claimed is:

1. An operation control apparatus for an external apparatus connected to a vehicle-mounted apparatus, the operation control apparatus being provided in a vehicle-mounted apparatus having one hard key to which a plurality of functions is assigned and a touch panel configured to display a soft key on the basis of image information transmitted from the external apparatus, controlling an operation by the external apparatus in accordance with an operation on either of the hard key or the soft key, the operation control apparatus comprising:

a positional information transmitting unit configured to, when the touch panel is pressed, transmit pressed position information describing the pressed position on the touch panel to the external apparatus as information for controlling an operation in the external apparatus;

an operation determining unit configured to determine whether or not the press on the touch panel has been an operation on a soft key for designating one of the plurality of functions assigned to the one hard key; and a state transition unit configured to, when the operation determining unit determines that there has been an operation on the soft key for designating one of the plurality of functions, shift a function acceptability state of the one hard key.

2. The operation control apparatus of claim 1, wherein the operation determining unit is configured to determine whether or not a press on the touch panel has been an operation on a soft key for designating one of the plurality of functions assigned to the one hard key on the basis of information transmitted from the external apparatus as a result of transmission of the pressed position information from the positional information transmitting unit to the external apparatus.

3. The operation control apparatus of claim 2, wherein the operation determining unit is configured to determine whether or not a press on the touch panel has been an operation on a soft key for designating one of the plurality of functions assigned to the one hard key on the basis of the change of the state of audio information transmitted from the external apparatus as a result of transmission of the pressed position information from the positional information transmitting unit to the external apparatus.

4. The operation control apparatus of claim 3, wherein the operation determining unit is configured to determine an operation on a soft key is designating a pause when the audio information changes from an output state to a stop state and to determine an operation on a soft key is designating a play start when the audio information changes from the stop state to the output state.

5. The operation control apparatus of claim 3, wherein the operation determining unit is configured to determine an operation on a soft key is designating a switch to turn on a mute function when the audio information changes from an output state to a stop state and to determine an operation on a soft key is designating a switch to turn off a mute function when the audio information changes from the stop state to the output state.

6. The operation control apparatus of claim 3, wherein the operation determining unit is configured to determine that a press on the touch panel has been an operation on a soft key for designating one of the plurality of functions assigned to the one hard key when the audio information changes from an output state to a stop state, or the audio information changes from the stop state to the output state, and the state after the change continues for a predetermined period of time.

7. The operation control apparatus of claim 2, wherein the operation determining unit is configured to determine whether or not a press on the touch panel has been an operation on a soft key for designating one of the plurality of functions assigned to the one hard key on the basis of image information transmitted from the external apparatus as a result of transmission of the pressed position information from the positional information transmitting unit to the external apparatus.

8. The operation control apparatus of claim 7, wherein the operation determining unit is configured to determine whether or not a press on the touch panel has been an operation on a soft key for designating one of the plurality of functions assigned to the one hard key by performing image recognition of a soft key included in image information transmitted from the external apparatus.

9. The operation control apparatus of claim 7, wherein the operation determining unit is configured to determine whether or not a press on the touch panel has been an operation on a soft key for designating one of the plurality of functions assigned to the one hard key by performing image recognition of time information included in image information transmitted from the external apparatus and determining whether the time information has changed or not.

10. The operation control apparatus of claim 2, wherein the operation determining unit is configured to determine whether or not a press on the touch panel has been an operation on a soft key for designating one of the plurality of functions assigned to the one hard key on the basis of operational state information transmitted from the external apparatus as a result of transmission of the pressed position information from the positional information transmitting unit to the external apparatus.

11. The operation control apparatus according to claim 1, further comprising:
a display position storage unit configured to store display positional information describing a position on the touch panel displaying a soft key corresponding to the one hard key,
wherein the operation determining unit is configured to determine whether or not a press on the touch panel has been an operation on a soft key for designating one of the plurality of functions assigned to the one hard key on the basis of the display positional information stored in the display position storage unit and the pressed position information on the touch panel.

12. The operation control apparatus according to claim 11, further comprising:
a display position computing unit configured to receive from the external apparatus soft key positional information describing the position of a soft key corresponding to the one hard key within image information transmitted from the external apparatus, compute the display positional information describing the position on the touch panel displaying the soft key on the basis of the soft key positional information, and store it in the display position storage unit.

13. An operation control method for an external apparatus connected to a vehicle-mounted apparatus, the operation control method in a vehicle-mounted apparatus having one hard key to which a plurality of functions are assigned and a touch panel configured to display a soft key on the basis of an image transmitted from the external apparatus controlling an operation by the external apparatus in accordance with an operation on either of the hard key or the soft key, the method comprising:
a first step of, when the touch panel is pressed, transmitting pressed position information describing the pressed position on the touch panel to the external apparatus as information for controlling an operation in the external apparatus;
a second step of determining whether or not the press on the touch panel has been an operation on the soft key for designating one of the plurality of functions assigned to the one hard key; and
a third step of, when the second step determines that it has been an operation on the soft key for designating one of the plurality of functions, shifting a function acceptability state of the one hard key.

* * * * *